United States Patent
Niranjayan et al.

(10) Patent No.: US 11,057,751 B1
(45) Date of Patent: Jul. 6, 2021

(54) USER IDENTIFICATION SYSTEM USING DIRECTIONAL ANTENNAS AND CAMERAS

(71) Applicant: AMAZON TECHNOLOGIES, INC., Seattle, WA (US)

(72) Inventors: Somasundaram Niranjayan, Issaquah, WA (US); Camerin Cole Hahn, Redmond, WA (US); Christopher Raymond Grajewski, Seattle, WA (US); Qicai Shi, Bothell, WA (US); Matthew Perkins, Shoreline, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/362,378

(22) Filed: Mar. 22, 2019

Related U.S. Application Data

(63) Continuation of application No. 14/981,699, filed on Dec. 28, 2015, now Pat. No. 10,244,363.

(51) Int. Cl.
*H04W 4/33* (2018.01)
*G08B 13/196* (2006.01)
(Continued)

(52) U.S. Cl.
CPC .......... *H04W 4/33* (2018.02); *G06K 9/00288* (2013.01); *G08B 13/19608* (2013.01); *G08B 13/19645* (2013.01); *H04W 4/027* (2013.01)

(58) Field of Classification Search
CPC .... H04N 7/181; H04N 7/142; H04N 1/00129; H04N 1/00307; H04N 5/2252; H04N 5/23206; H04N 5/23293; H04N 5/772; H04N 5/7788; H04N 21/4223; H04N 21/43637; A01K 61/60; A01K 61/80;
(Continued)

(56) References Cited

U.S. PATENT DOCUMENTS 7,225,980 B2  6/2007  Ku et al.
7,532,113 B2  5/2009  Horvitz et al.
(Continued)

OTHER PUBLICATIONS

Asthana, et al. "An Indoor Wireless System for Personalized Shopping Assistance" CiteSeerX, In Proceedings of IEEE Workshop on Mobile Computing Systems and Applications, 1994. Retrieved from the Internet: http://citeseerx.ist.psu.edu/viewdoc/summary?doi=10.1.1.127.3033&rank=1.
(Continued)

*Primary Examiner* — Farid Seyedvosoghi
(74) *Attorney, Agent, or Firm* — Lindauer Law, PLLC

(57) ABSTRACT

A facility may include antennas directed to a known location and cameras with a field-of-view that encompasses the known location. The antennas acquire a device identifier and device data from a mobile device carried by a user at the known location. Antenna data is then generated to describe the data acquired by the antennas. Image data is also generated from the cameras to include images of a person at the known location. The antenna data and image data are then processed to determine estimated motion values and a comparison of such values is performed to check if such motion values are within a threshold of one another. If the motion values are within a threshold of each other, data indicative of presence of the mobile device at the known location is generated.

20 Claims, 10 Drawing Sheets

(51) Int. Cl.
*H04W 4/02* (2018.01)
*G06K 9/00* (2006.01)

(58) Field of Classification Search
CPC .......... B61C 17/00; B61L 23/00; H04W 4/33; H04W 4/027; G06K 9/00288; G08B 13/19645; G08B 13/19608
USPC .............................................. 455/456, 456.1
See application file for complete search history.

(56) References Cited

U.S. PATENT DOCUMENTS

| | | | |
|---|---|---|---|
| 7,598,865 | B2 | 10/2009 | Zhang et al. |
| 7,949,568 | B2 | 5/2011 | Fano et al. |
| 8,009,864 | B2 | 8/2011 | Linaker et al. |
| 8,189,855 | B2 | 5/2012 | Opalach et al. |
| 8,320,939 | B1 | 11/2012 | Vincent |
| 8,630,924 | B2 | 1/2014 | Groenevelt et al. |
| 8,849,867 | B1 | 9/2014 | Pilloff |
| 9,235,928 | B2 | 1/2016 | Medioni et al. |
| 9,661,470 | B1* | 5/2017 | Du Bois ................ G01S 15/50 |
| 2004/0153671 | A1 | 8/2004 | Schuyler et al. |
| 2004/0229631 | A1* | 11/2004 | George ................ G01S 5/0294 455/456.1 |
| 2005/0143091 | A1 | 6/2005 | Shapira et al. |
| 2007/0259624 | A1* | 11/2007 | Alizadeh-Shabdiz ...................... G01S 11/02 455/67.11 |
| 2008/0106468 | A1* | 5/2008 | Litva ..................... G01S 5/0252 342/451 |
| 2009/0102719 | A1* | 4/2009 | Lin ....................... H04W 4/029 342/450 |
| 2011/0011936 | A1 | 1/2011 | Morandi et al. |
| 2012/0212567 | A1 | 8/2012 | Brooksby et al. |
| 2012/0284132 | A1 | 11/2012 | Kim et al. |
| 2013/0284806 | A1 | 10/2013 | Margalit |
| 2014/0114493 | A1 | 4/2014 | Tsukamoto et al. |
| 2015/0086107 | A1 | 3/2015 | Dedeoglu et al. |
| 2016/0073229 | A1 | 3/2016 | Haro et al. |
| 2016/0283989 | A1* | 9/2016 | Esquilla, Jr. ....... G06Q 30/0281 |

OTHER PUBLICATIONS

Fung, Brian, "How stores use your phone's WiFi to track your shopping habits", The Washington Post. Oct. 19, 2013. [retrieved on Dec. 1, 2015]. Retrieved from Internet: https://www.washingtonpost.com/news/the-switch/wp/2013/10/19/how-store.

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing, China, Sep. 17-21, 2011, 10 pages. Retrieved from the Internet: http://www.researchgate.net/publication/221568350_How_to_nudge_in_Situ_designing_lambent_devices_to_deliver_salient_information_in_supermarkets_.

Kwapisz, et al., "Cell Phone-Based Biometric Identification". Retrieved from the Internet: http://www_cis.fordham.edu/wisdm/includes/files/btas10.pdf.

Sridharan, Karthik, "Automatic Gait Recognition". Retrieved from the Internet: http://llic.uchicago.edu/-karthik/gail.pdf.

Pop, Cristian, "Introduction to the BodyCom Technology" AN1391, DS01391A, Microchip Technology, Inc., May 2, 2011. Retrieved from the Internet: http://www.microchip.com//wwwAppNotes/AppNotes.aspx?appnote=en555156.

Sarwar, Babar, "Non-final Office Action dated Jul. 27, 2017", U.S. Appl. No. 14/981,699, The United States Patent and Trademark Office, filed Jul. 27, 2017.

Sarwar, Babar, "Non-final Office Action dated Jun. 15, 2018",U.S. Appl. No. 14/981,699, The United States Patent and Trademark Office, filed Jun. 15, 2018.

Sarwar, Babar, "Notice of Allowance dated Dec. 5, 2017", U.S. Appl. No. 14/981,699, The United States Patent and Trademark Office, filed Dec. 5, 2017.

Sarwar, Babar, "Notice of Allowance dated Oct. 26, 2018", U.S. Appl. No. 14/981,699, The United States Patent and Trademark Office, filed Oct. 26, 2018.

Vu, et al., "Distinguishing Users with Capacitive Touch Communication" WINLAB, Rutgers University, In proceedings of: The 18th Annual international Conference on Mobile computing and networking. Pages 197-208. Aug. 2012. Retrieved from the Internet: http://www.winlab.rutgers.edu/~janne/capacitivetouch_mobicom12.pdf.

* cited by examiner

USER IDENTIFICATION SYSTEM USING DIRECTIONAL ANTENNAS AND CAMERAS

PRIORITY

This application is a continuation of, and claims priority to, U.S. patent application Ser. No. 14/981,699, filed on Dec. 28, 2015, entitled "Entry Portal Identification System," now U.S. Pat. No. 10,244,363, which is hereby incorporated by reference in its entirety.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping area or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the entry of users into the facility, movement of inventory, users, and other objects within the facility, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
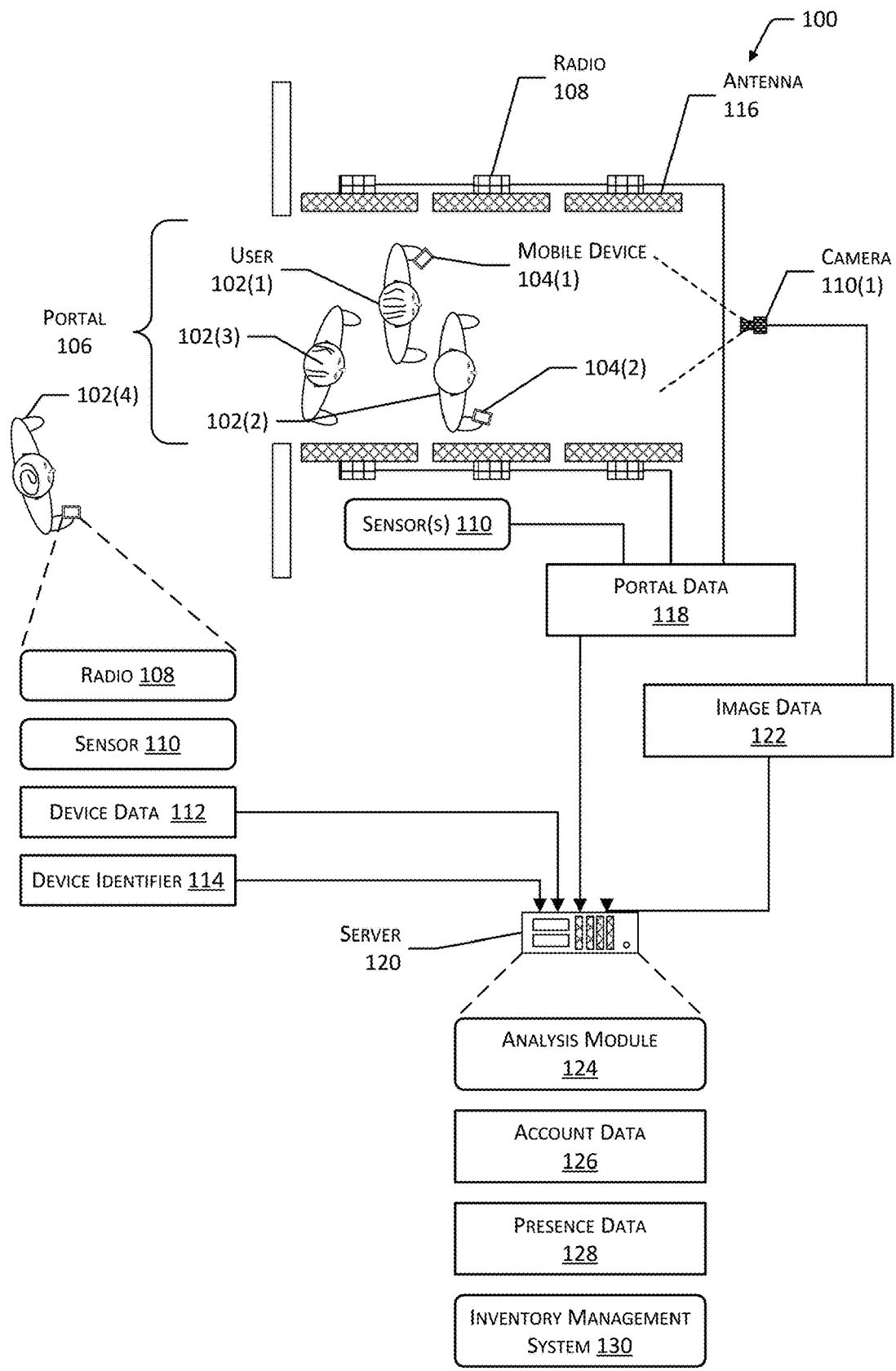
FIG. 1 illustrates a system to provide a portal at a facility through which users may travel unimpeded and be identified, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to".

DETAILED DESCRIPTION

This disclosure describes systems and techniques for associating an account with a person at a portal. In one implementation, one or more portals may be deployed at a materials handling facility (facility).

The facility may include, or have access to, an inventory management system. The inventory management system may be configured to maintain information about items, users, condition of the facility, and so forth. For example, the inventory management system may maintain data indicative of what items a particular user is ordered to pick, location of the particular user, availability of a user providing support services to others, requests for assistance, environmental status of the facility, and so forth. The inventory management system, or another system, may generate this data based on sensor data, such as images acquired from imaging sensors like cameras, weight data acquired by weight sensors in shelves, and so forth. For example, the images may be used to identify an object such as a user or item, track the object, and so forth.

The portal allows one or more users to enter the facility without impediment. From the perspective of a person passing through the portal, they pass without having to take any action. After passage through one or more portals, an account associated with a particular user may be associated with the person. Once the account has been associated, further tracking may maintain that association. For example, once identified using the portal, image data from cameras in the facility may be processed to track that identified user as they move about in the facility.

The portal comprises one or more antennas coupled to a radio. The antennas may be directional in that they provide gain in a particular direction at a particular frequency. The antennas may have fixed directionality or may be electronically steerable. The antennas are arranged to provide coverage within an area through which one or more users may pass.

Users may have in their possession one or more mobile devices. For example, the mobile device may comprise a smartphone, wearable computer, fitness tracker, and so forth. The mobile device may have a device identifier, such as a media access control (MAC) address, integrated circuit card identifier (ICCID), serial number, and so forth.

The mobile device may include one or more sensors, such as accelerometers, gyroscopes, magnetometers, and so forth. The mobile device acquires data from these one or more sensors and generates device data. The device data includes accelerometer data, gyroscope data, a compass heading obtained from a magnetometer, and so forth.

As the mobile device passes through the portal with the user, the radio in the portal antennas may emit a portal signal. The mobile device, responsive to the portal signal, transmits a device signal. For example, the portal signal may be sent as a Bluetooth broadcast. The device signal sent by the mobile device may also be sent as a Bluetooth broadcast. In this implementation, the portal signal and the device signal may be provided without the communications overhead associated with establishing a connection between the devices.

The device signal may be used to transfer data. In one implementation, the payload of the Bluetooth broadcast sent by the mobile device may include the device identifier and at least a portion of the device data. For example, the Bluetooth broadcast may include the MAC address and accelerometer data for the 5 seconds prior to transmission.

The portal is configured to generate portal data. In one implementation, the portal data may include data indicative of received signal strength of the device signal and information indicative of the specified volume associated with the antenna. For example, the specified volume may comprise a volume through which a primary lobe of the gain associated with the antenna passes. In another implementation, the portal data may comprise a distance and a relative bearing indicative of a direction to the transmitter on the mobile device. In yet another implementation, the portal data may include coordinates relative to the facility that indicate a determined location of the transmitter on the mobile device.

The accuracy of a determined location of a transmitter may be limited. For example, the location of a transmitter may be determined to within 50 centimeters (cm). However, during operation, individual persons in the portal may be so close that individuals cannot be distinguished using portal data.

While the accuracy of the transmitter may be limited, other information may also be determined from the portal data. An estimated motion value may be generated from the portal data that provides information about movement of the mobile device at the portal. For example, the portal data acquired over a period of time may be used to determine a first location in space at a first time and a second location in space at a second time. Based on the difference in time and distance between the first location and the second location, the estimated motion value may comprise a vector indicative of a speed and direction of change in location.

The device data received from the mobile device provides information about the movement of the mobile device. The device data may be processed to generate an inertial motion value. The inertial motion value provides information indicative of movement of the sensor associated with the mobile device. For example, the accelerometer data obtained over a period of time may be integrated to determine an overall vector indicative of change in speed and direction of change in location, with magnetometer data providing information such as a compass heading.

The estimated motion value and the inertial motion value may be compared to determine if the two are within a threshold value of one another. For example, the estimated motion value may indicate that the transmitter of the mobile device was moving with a heading of 170° at 0.89 meters/second (m/s). The inertial motion value may indicate that the mobile device was moving with a heading of 181° at 0.76 m/s. The threshold value may indicate that headings within 20° of one another are to be deemed similar, and that speeds within ±0.15 m/s of one another are deemed to be similar. Continuing the example, the estimated motion value and the inertial motion value are determined to be within a threshold value of one another.

In some implementations, the portal may be configured with one or more features or obstructions designed to elicit a particular set of accelerations or changes in direction of the mobile device. For example, the portal may include decorative features such as posts that the user carrying the mobile device may navigate around. Given a known location of these obstructions, or using information from testing during set up of the portal, a profile of particular accelerations may be determined. Additionally, the antennas may be configured to have gain specific to one side of the obstruction or another. As a result, the portal data and the corresponding estimated motion value and inertial motion value may indicate a particular displacement, such as a turn to the left. Combined with other information such as received signal strength, the presence and location of the mobile device may be determined.

Account data may have been previously stored that associates a particular device identifier with a particular account. Based on the determination that the estimated motion value and the inertial motion value correspond, presence data may be generated that indicates a mobile device associated with the particular account is present at the portal.

The presence data may be utilized by the inventory management system to facilitate operation of the facility. For example, image data may be obtained using a camera with a field-of-view including at least a portion of the portal. As the particular account for a particular person who is a user is determined at the portal, the image of the person may be associated with the particular account for further tracking. Instead of, or in addition to, the use of portals throughout the facility, cameras may be used to provide for optical tracking of the user as they move about the facility.

In some implementations, the image data obtained from the camera covering the portal may be used to assist in the association of the person at the portal with a particular account. For example, the image data may be processed to generate one or more of an image gait value or an image motion value. The image gait value may provide information associated with a gait of the person within the portal. For example, the image gait value may indicate a gait cadence of the person within the portal based on image data of the feet of the person coming into contact with the floor of the portal. In another example, the image motion value may describe a trajectory of the person based on changes in apparent motion of at least a part of the person, changes in apparent position within the image data relative to other objects depicted in the image data, and so forth. In some implementations, depth data may also be obtained, such as using a depth sensor. By processing depth data obtained at different times, information such as speed, direction, and so forth, of an object such as the user may be determined.

One or more of the image gait value or the image motion value may also be used to disambiguate between different persons depicted in the image data obtained at the portal. For example, a group of people may pass through the portal at the same time. Image data alone may be insufficient to provide an accurate count of the persons at the portal. For example, a group of people may be walking closely together, carrying children, and so forth, which may result in a count based on the image data of those people entering the facility that is incorrect. The portal data may be processed to determine a count of distinct device identifiers at the portal. This count may be used to determine the number of people carrying mobile devices passing through the portal.

Image data may also be insufficient to accurately identify persons based on their appearance. For example, sunglasses, attire, jewelry, changes in hair color, and so forth, may limit the accuracy of identification based only on the image data. By utilizing the other information acquired at the portal, a person may be associated with a particular account. Furthermore, that person may be associated with a particular portion of the image data.

In one implementation, the correspondence between the inertial motion value and the image gait value may be used to disambiguate one person from another that appear within the same frames of image data. For example, the image data may include images of three people moving through the portal. A confidence value of identification based on image data alone may be below a threshold value indicating that such image-based identification is unreliable. The image data may be used to determine information such as the image gait value for each of the persons appearing in the image. By comparing the inertial motion value to the image gait value, the account may be associated with a particular person appearing in the image data. Continuing the example, the first person may have a gait cadence of 60 steps per minute, the second person may have a gait cadence of 35 steps per minute, and the third person may have a gait cadence of 50 steps per minute. The comparison between the image gait value and the inertial motion value may be used to distinguish between these three people.

By combining the information from different sources such as the receivers at the portal, the sensors on board the mobile device, and cameras, the presence of a user associated with a particular account may be determined at the portal. Furthermore, a particular account may be associated with a particular image of a person at the portal, facilitating further tracking of the user with image data. This information may then be used by an inventory management system to associate particular interactions such as the pick or place of items at an inventory location with a particular account. As a result, the overall operation of the facility and the user experience may be improved.

Illustrative System

FIG. 1 illustrates a system 100 to provide a portal at a facility through which people may travel unimpeded and be identified as users, according to some implementations. A user 102 having a mobile device 104 in their possession may approach and pass through a portal 106. The portal 106 may include one or more structures such as walls, posts, pillars, decorative elements, and so forth. These structures may be used to direct users 102 through the portal 106 without necessarily impeding their ability to pass through the portal 106. For example, the portal 106 may comprise a curving corridor, entryway to the facility, decorative plants around which the users 102 must move to enter, and so forth.

The mobile device 104 may comprise one or more of a smartphone, wearable computer, fitness tracker, and so forth. The mobile device 104 may include a radio 108. The radio 108 may comprise one or more of a transmitter or receiver suitable for sending and receiving signals. The signal may be used to convey information. For example, the radio 108 may be part of a wireless network communication interface that is compatible with one or more of Bluetooth, Wi-Fi, and so forth. In another example, the radio 108 may comprise a Bluetooth Low Energy (BLE) transmitter.

The mobile device 104 may include one or more sensors 110. For example, the sensors 110 may include an accelerometer, a gyroscope, a magnetometer, a navigation system such as a Global Positioning System (GPS) receiver, an acoustic transducer or microphone, and so forth. Output from one or more of the sensors 110 may be used to generate device data 112. The device data 112 provides information about movement of the mobile device 104. For example, device data 112 may comprise a set of measurements at particular times indicated by timestamps. The measurements may be obtained by the accelerometer, compass heading information obtained from the magnetometer, velocity information obtained from the navigation system, and so forth. In some implementations where the portal 106 includes magnets to generate magnetic fields, the magnetometer data may indicate compass headings or field strengths that result from these magnets.

The portal 106 may include other types of emitters or sources that generate signals detectable by the mobile device 104. For example, the portal 106 may include ultrasonic transducers or speakers that generate ultrasonic sound. The sound may then be detected by a microphone of the mobile device 104. Information about the detected ultrasonic signal may then be included in the device data 112.

The mobile device 104 may have a device identifier 114. The device identifier 114 may comprise information such as a media access control (MAC) address, integrated circuit card identifier (ICCID), serial number, and so forth.

The mobile device 104 may use the radio 108 to send at least a portion of the device data 112 and the device identifier 114 to one or more radios 108 associated with the portal 106. For example, the portal 106 may have a radio 108 coupled to an antenna 116. The antenna 116 may be configured to provide gain to a particular volume within the portal 106. In some implementations, the antenna 116 may comprise sub elements or sub antennas arranged into a steerable array. For example, the antenna 116 may comprise a phased array. The phased array may include a plurality of individual antenna elements that are arranged in a particular physical configuration and which transfer radio frequency energy to a transmission line with predetermined electrical characteristics to produce particular electromagnetic coupling effects between one or more of the antenna elements. As a result of these particular electromagnetic coupling effects, gain may be realized in a particular direction. The phased array may be fixed and configured such that gain is provided in a particular direction or may be steerable such that a direction of the gain may be changed. In another example, the antenna 116 may comprise a dipole placed in front of a radio frequency reflector, a Yagi-Uda array having a driven element and one or more director elements or reflector elements, a parabolic antenna, and so forth. In some implementations, a plurality of antennas 116 may be coupled to a single radio 108.

As illustrated here, the portal 106 comprises a passageway lined with the antennas 116. The antennas 116 may be located to one or more sides of the passageway, above, below, or any combination thereof. Signals acquired by the antennas 116 and detected by the radio 108 may be processed to generate portal data 118. For example, the radio 108 may detect a signal received from the mobile device 104 that then may be demodulated to produce the portal data 118.

In some implementations, one or more other sensors 110 may be present at the portal 106. For example, weight sensors may detect the force applied by one or more of the user's 102 feet during passage through the portal 106.

The portal data 118 comprises information about a signal received by the antennas 116 of the portal 106. The mobile device 104 may be configured to respond to a portal signal sent by the radio 108 of the portal 106. For example, the radio 108 of the portal 106 may broadcast a portal signal using the Bluetooth protocol. In response to receiving the portal signal, the radio 108 of the mobile device 104 may send the device signal. The device signal may include the device data 112 and the device identifier 114 of the mobile device 104. The portal data 118 may comprise received signal strength values indicative of signal strength of the device signal as acquired by one or more of the antennas 116, a timestamp indicative of when the signal is received, and the device identifier 114 associated with the device signal.

In some implementations, the portal data 118 may comprise other information that is based on or derived from at least a portion of the device signal. For example, one or more of the systems associated with the portal 106 may be configured to determine a relative bearing and a distance to the mobile device 104 based on the device signal. Continuing the example, the radio 108 and antenna 116 may comprise a system with a hardware processor to generate the relative bearing and distance information.

The portal 106 may be configured with one or more magnets or electromagnets that generate a magnetic field. These magnetic fields may be detectable by a magnetometer of the mobile device 104. For example, magnets may be arranged to produce a particular magnetic field. Based on the movement through the magnetic field, changes in the magnetometer data included in the device data 112 may be used to determine information about the position of the mobile device 104 at a particular time.

In another implementation, the radio 108 of the mobile device 104 may be configured to generate device data 112 that may be used in place of, or in addition to, the portal data 118. For example, the radios 108 of the portal 106 may transmit signals that are then received by the radio 108 of the mobile device 104. The device data 112 obtained by the mobile device 104 may comprise the received signal strength at the mobile device 104 along with one or more of a timestamp or data indicative of a particular transmission. For example, each transmission made by the portal 106 may include transmission identification number. The device data 112 may then be processed to determine a location of the mobile device 104 at the time the transmissions were received.

The device data 112, device identifier 114, and the portal data 118 may be provided to a server 120. In one implementation, the device data 112 and the device identifier 114 may be received by the radio 108 at the portal 106 and relayed to the server 120. In another implementation, the mobile device 104 may establish a connection with the server 120 and send the device data 112 by way of the connection.

The server 120 may also be configured to receive image data 122 obtained from one or more imaging sensors or cameras 110(1). The camera 110(1) may be configured to generate image data 122 comprising still images, video, or both of at least a portion of a volume of the portal 106 through which the users 102 may pass. For example, a first camera 110(1)(1) may be configured to acquire images of the faces of the users 102, while a second camera 110(1)(2) may be configured to acquire images of the legs and feet of the users 102.

The server 120 may execute at least a portion of an analysis module 124. The analysis module 124 is configured to use one or more of the device data 112, a device identifier 114, the portal data 118, or the image data 122 during operation. In one implementation, the analysis module 124 may determine the movements of the mobile device 104 associated with the user 102 (as indicated by the device data 112) correspond to information about those movements that are determined from the signals received by the radio 108 at the portal 106, the image data 122 acquired by the camera 110(1) at the portal 106, and so forth. This determination is described in more detail in the following figures.

Account data 126 may be accessed that associates particular device identifier values with particular accounts. For example, the account data 126 may comprise a table or other data structure that relates a MAC address with a particular account number. The device identifier 114 that is received from the mobile device 104 may be used to look up the particular account in the account data 126.

Based at least in part on the information obtained at the portal 106 and the correspondence between the device identifier 114 and the information in the account data 126, presence data 128 may be generated. The presence data 128 may comprise information indicative of the presence of a person associated with a particular account at the portal 106 at a particular date and time.

The presence data 128 may be provided to an inventory management system 130. The inventory management system 130 may be configured to maintain information about items, users 102, condition of the facility, and so forth. For example, the inventory management system 130 may maintain data indicative of a number of items at a particular inventory location, what items a particular user 102 is ordered to pick, how many items have been picked or placed at the inventory location by the particular user 102, requests for assistance, environmental status of the facility, and so forth.

While this disclosure describes the use of radio frequency (RF) signals, it is understood that in other implementations optical, acoustic, magnetic, or other signals may be used instead of, or in conjunction with, RF signals.

Figure 2:
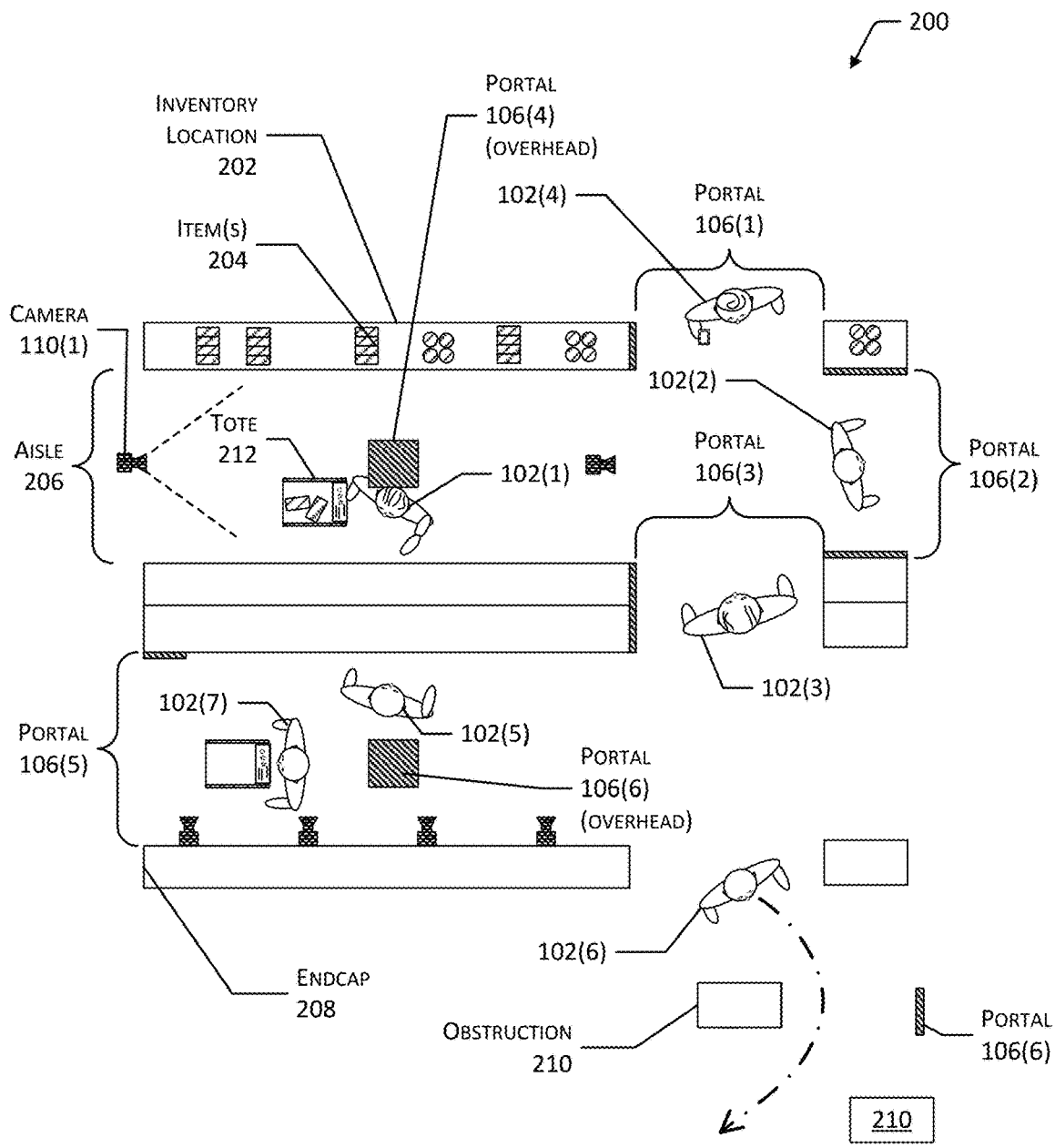
FIG. 2 depicts an overhead view of a portion of the facility depicting the location of various portals, according to some implementations.

FIG. 2 depicts an overhead view 200 of a portion of the facility depicting the location of various portals 106, according to some implementations. In some implementations, the facility may include one or more inventory locations 202. The inventory locations 202 may include one or more of a shelf, a rack, a case, a cabinet, a bin, a floor location, or other suitable storage mechanisms for holding, supporting, or storing items 204.

The inventory locations 202 may be arranged in various physical configurations, such as aisles 206. The inventory locations 202 may be affixed to the floor or another portion of the structure of the facility. The inventory locations 202 may also be movable such that the arrangements of aisles 206 may be reconfigurable. In some implementations, the inventory locations 202 may be configured to move independently of an outside operator. For example, the inventory locations 202 may comprise a rack with a power source and a motor, operable by a computing device to allow the rack to move from one location within the facility to another.

In some implementations, the end of an aisle 206 may include an endcap 208. The endcap 208 may comprise inventory locations 202, promotional displays, and so forth. For example, the endcap 208 may include another inventory location 202 such as shelving or refrigerated case to hold items 204.

One or more portals 106 may be arranged within the facility as shown here. In some implementations, the portals 106 may be configured to constrain movement of the users 102, such as providing a path along which the user 102 may travel. In some situations, obstructions 210 may be used to elicit a particular direction of travel with respect to a portal 106. For example, a particular obstruction 210 may result in a direction of travel that brings the user 102 closer to an antenna 116 of the portal 106. In another example, the obstruction 210 may result in a particular pattern of motion that may be detected when analyzing the device data 112 obtained from the mobile device 104.

The use of multiple portals 106 within the facility may facilitate the association of a particular person with a particular account. For example, a group of users 102 may enter the facility passing through a first portal 106(1). Members of the group of users 102 may subsequently split off and go about their own individual tasks, passing through other portals 106 along the way. By separating from one another, a particular person may be associated with a particular account. A user 102 may utilize a tote 212 to carry one or more items 204 while at the facility. The tote 212 is discussed in more detail below.

FIG. 2 also illustrates an example of presence data 128. For example, a group that includes users 102(1), 102(2), and 102(3) is shown appearing at an entry portal 106 at a particular time. Later presence data 128 indicates individual users 102 present at different portals 106 within the facility after they have separated from the group.

Figure 3:
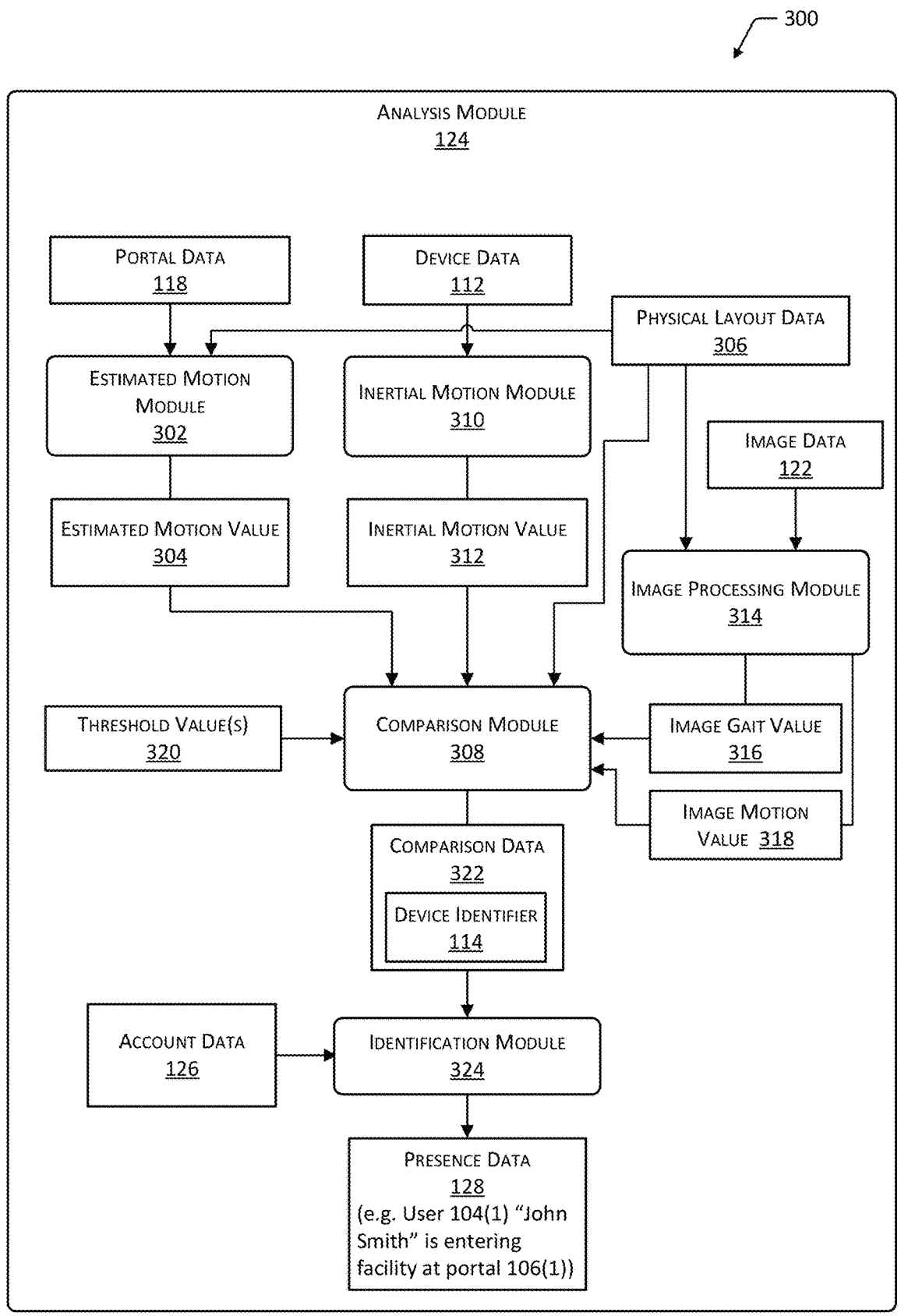
FIG. 3 is a block diagram of an analysis module that can determine presence data which identifies the user at the portal, according to some implementations.

FIG. 3 is a block diagram 300 of an analysis module 124 that can determine presence data 128 that identifies the user 102 at the portal 106, according to some implementations. In some implementations, at least a portion of the analysis module 124 may execute on the server 120. The analysis module 124 may include, or operate in conjunction with, one or more of the following modules.

An estimated motion module 302 is configured to process the portal data 118 and generate an estimated motion value 304. The estimated motion value 304 comprises information indicative of movement of the mobile device 104 based on one or more signals transmitted by the radio 108 of the mobile device 104. In some implementations, the estimated motion value 304 may comprise one or more vectors that are indicative of direction and speed. In some implementations, the estimated motion value 304 may include a temporal component. For example, the estimated motion value 304 may provide information of changes in the motion over time.

The estimated motion module 302 may use portal data 118 obtained at different times to generate the estimated motion value 304. For example, the estimated motion module 302 may determine a first location of the mobile device 104 at a first time and a second location of the mobile device 104 at a second time. A distance between the first location and the second location may be calculated, as well as total time between the first time and second time. Based on a direction of travel extending from the first location to the second location, the distance, and the total time, the estimated motion value 304 may be calculated.

The location of the mobile device 104 may be determined using a variety of techniques. In one implementation, the location may be determined based on received signal strength and the known location of one or more antennas 116. The estimated motion module 302 may access physical layout data 306.

The estimated motion value 304 may also include information indicative of a gait of a user 102. For example, weight sensors 110(6) in the floor of the portal 106 may provide portal data 118 that is processed by the estimated motion module 302 to determine force of one or both of the user's 102 feet, spacing, cadence, and so forth, associated with the gait of the user 102.

The physical layout data 306 may provide information indicative of where antennas 116 are located, location of sensors 110 such as the cameras 110(1) or weight sensors 110(6), position of the inventory locations 202, and so forth. For example, the physical layout data 306 may comprise information representative of a map or floor plan of the facility with relative positions of antennas 116, portals 106, obstructions 210, walls and floors, magnetic field sources, ultrasonic transducers, data indicative of how items 204 are to be arranged at the inventory locations 202, and so forth. The physical layout data 306 may associate a particular inventory location ID with other information such as physical location data, sensor position data, sensor direction data, sensor identifiers, and so forth. In some implementations, the physical location data may be relative to another object. For example, the physical location data may indicate that a particular antenna 116 or magnetic field source is located at a particular side of the portal 106.

Returning to the estimated motion module 302, information about the relative or absolute location of the antennas 116 at the portal 106 may be obtained from the physical layout data 306. Given this information, and based on received signal strength obtained from the antennas 116 at the portal 106, an estimate of the location of the mobile device 104 may be obtained.

In another implementation, the antenna 116 may be steerable such that gain may be directed in a particular direction. The steering of the antenna 116 may be done manually, electronically, fluidically, and so forth. For example, the antenna 116 may comprise an electronically steerable phased array having a plurality of fixed antenna elements for which electrical phasing may be varied to provide for directionality in an antenna pattern without moving any physical elements of the fixed antenna elements. During operation, data about an angular bearing at which gain of the antenna pattern is directed may be determined. The angular bearing may be used to determine location of the transmitter. For example, two electronically steerable phased array antennas 116(1) and 116(2) may be separated by a known distance. A location of the mobile device 104 may be triangulated by using angular bearings from the first antenna 116(1) and the second antenna 116(2).

In yet another implementation, an angular bearing provided by a steerable antenna 116 may be combined with an estimated distance to the transmitter to determine location. The estimated distance to the transmitter may be based at least in part on the value of the received signal strength.

In other implementations, other techniques may be used to determine an estimated location of the mobile device 104 based on signals transmitted by the mobile device 104. The estimated motion value 304 may be provided to a comparison module 308. The comparison module 308 is described in more detail below.

An inertial motion module 310 may be configured to process the device data 112 to generate an inertial motion value 312. The inertial motion value 312 provides information indicative of movement of the sensor 110 associated with the mobile device 104. In some implementations, the inertial motion value 312 may comprise one or more vectors that are indicative of direction and speed. In some implementations, the inertial motion value 312 may include a temporal component, such as information indicative of changes in motion over time. The inertial motion value 312 may be provided to the comparison module 308. The comparison module 308 may use the physical layout data 306 to compare the inertial motion value 312 with the physical layout data 306. Information about the physical layout of structures in the facility may be known to elicit a particular pattern of motion. For example, the obstruction 210 may result in a change of direction in the path of the mobile device 104 that may be determined from the inertial motion value 312. Based on this determination, the presence of the mobile device 104 near the obstruction 210 may be determined.

Information about the biomechanics of the user 102 such as the general anatomical shape and expected dimensions of the user 102, likely locations for the mobile device 104 relative to the user 102, construction details about the mobile device 104, position of the sensors 110 with respect to the mobile device 104, and so forth, may be used as inputs to the inertial motion module 310. In one implementation, the inertial motion module 310 may utilize a linear quadratic estimation (LQE) or Kalman filtering to generate the inertial motion value 312 based on the device data 112.

An image processing module 314 may be configured to process the image data 122 to generate one or more of image gait value 316 or image motion value 318. The image gait value 316 may be indicative of one or more aspects associated with movement of one or more limbs of the user 102. For example, the image gait value 316 may indicate a cadence such as a number of steps per minute made by the user 102, information about time intervals between steps, and so forth. In another example, the image gait value 316 may include information indicative of particular times at which the foot of the user 102 touches the floor, leaves the floor, and so forth.

Gait may be affected by height, age, and other factors associated with the user 102. Gait recognition techniques may be used to analyze the relative position and motion of limbs of the user 102 in the image data 122. Limbs may include one or more arms, legs, and in some implementations, the head. In one implementation, edge detection techniques may be used to extract a position of one or more limbs of the user 102 in the series of images. For example, a main leg angle of a user's 102 leg may be determined, and based on the measurement of this main leg angle over time and from different points-of-view, a three-dimensional model of the leg motion may be generated. The change in position over time of the limbs may be determined and used to generate the image gait value 316.

The image motion value 318 comprises information indicative of movement of at least a portion of the user 102 based on one or more of the images in the image data 122. In some implementations, the image motion value 318 may comprise one or more vectors that are indicative of direction and speed of at least a portion of the user 102. For example, the vector value may indicate an apparent or actual motion of a point that is based on the head and shoulders of the user 102. In some implementations, the image motion value 318 may be determined using an optical flow function, such as found in the OpenCV library. In another implementation, stadiametric ranging, such as based on an assumed average distance between the eyes of a user 102, average size of head, and so forth, may be used to determine a distance from the camera 110(1) to the user 102. Based on this information, the location of the user 102 may be determined. A mapping matrix may associate particular locations within a frame of an image to particular locations in the facility. By using the stadiametric ranging and the mapping matrix, a location within the facility may be determined in a given image. By using information from locations at successive times, direction, speed, acceleration, and so forth, may be calculated.

In some implementations, the camera 110(1) may comprise a depth sensor 110(2) such as described below. The depth sensor 110(2) may produce data indicative of the location, speed, direction, acceleration, and other information about an object in view of the depth sensor 110(2). The image motion value 318 may be based at least in part on this information.

The image data 122 may be acquired from cameras 110(1) at different locations relative to the portal 106. For example, a pair of cameras 110(1) may provide for stereoscopic image acquisition. In other implementations, the image motion value 318 may be determined based at least in part on three-dimensional data obtained from a depth sensor 110(2).

The comparison module 308 is configured to determine similarity between one or more input values. While various combinations of comparisons are described, it is understood that any combination of inputs based on one or more of the device data 112, the portal data 118, or other data may be used. In some implementations, comparison module 308 may utilize one or more threshold values 320. The threshold values 320 may specify one or more of the minima, maxima, range, percentage, and so forth. The comparison module 308 provides comparison data 322 as output. The comparison data 322 may indicate that the values being compared are determined to represent the same user 102.

The comparison module 308 may determine if the estimated motion value 304 is within a threshold value 320 of an inertial motion value 312. For example, the estimated motion value 304 may indicate a vector having a heading of 170° at 0.89 m/s. The inertial motion value 312 may indicate a vector having a heading of 181° at 0.76 m/s. The threshold value 320 may indicate that headings within 20° of one another are to be deemed similar, and that speeds within ±0.15 m/s of one another are deemed to be similar. Continuing the example, the estimated motion value 304 and the inertial motion value 312 are determined to be within a threshold value 320 of one another, and comparison data 322 indicative of this may be generated.

The comparison module 308 may also determine if the estimated motion value 304 is within a threshold value 320 of the image motion value 318. For example, the estimated motion value 304 may indicate a vector having a heading of 170° at 0.89 m/s. The image motion value 318 may indicate a vector having a heading of 167° at 0.81 m/s. The threshold value 320 may indicate that headings within 10° of one another are to be deemed similar, and that speeds within ±0.10 m/s of one another are deemed to be similar. Continuing the example, the estimated motion value 304 and the image motion value 318 are determined to be within a threshold value 320 of one another, and comparison data 322 indicative of this may be generated.

The comparison module 308 may also determine if the estimated motion value 304 is within a threshold value 320 of the image gait value 316. For example, the estimated motion value 304 may provide information that the user 102 is walking with a first step cadence of 17 steps per minute. The image gait value 316 may indicate the user 102 is walking with a second step cadence of 15 steps per minute. The threshold value 320 may indicate that cadences within 3 steps per minute of one another are to be deemed similar. Continuing the example, the estimated motion value 304 and the image gait value 316 are determined to be within a threshold value 320 of one another, and comparison data 322 indicative of this may be generated.

The comparison module 308 may determine if the inertial motion value 312 is within a threshold value 320 of one or more of the estimated motion value 304 indicative of gait, the image gait value 316, or the image motion value 318. The estimated motion value 304 may comprise information indicative of the motion of the user 102, such as the gait based on the portal data 118. The inertial motion value 312 may comprise information indicative of the motion of the user 102 walking through at least a portion of the portal 106, such as timing of the steps of the user 102. The inertial motion value 312 may be compared with the image gait value 316 or the estimated motion value 304 that also indicate timing of the steps of the user 102. If the timing of the steps between the two corresponds within the threshold value 320, the two values may be deemed to be indicative of the same user 102 and comparison data 322 may be generated.

The comparison module 308 may determine if the inertial motion value 312 is within a threshold value 320 of the image motion value 318. The inertial motion value 312 may be indicative of a first trajectory of the user 102 based on the device data 112. The image motion value 318 may be indicative of a second trajectory of the user 102 based on the image data 122. If the first trajectory and the second trajectory are within a threshold value 320 of each other, comparison data 322 may be generated indicating that they are representative of the same user 102.

The comparison module 308 may use different threshold values 320 for different types of comparisons. For example, comparisons between estimated motion values 304 and inertial motion values 312 may use a first threshold value 320(1) while comparisons between the estimated motion value 304 and the image motion value 318 may use a second threshold value 320(2).

The comparison module 308 may generate comparison data 322 based on one or more comparisons, such as those described above. For example, the comparison module 308 may generate comparison data 322 based on comparisons between the estimated motion value 304, the inertial motion value 312, the image gait value 316, and the image motion value 318. The comparison data 322 may include the device identifier 114 associated with the comparisons. For example, the device identifier 114 included in the portal data 118 may be included in the comparison data 322 involving the estimated motion value 304. In another example, the device identifier 114 associated with the device data 112 may be included in the comparison data 322 involving the inertial motion value 312.

The comparison data 322 is accessed by an identification module 324. The identification module 324 accesses account data 126. The account data 126 provides information that associates a particular device identifier 114 with a particular account. For example, the MAC address 74:72:6f:70:69:63 of the mobile device 104 that sent the device data 112 may be used to query a data store of the account data 126. The query may return a result of the account identifier 3032674905 that identifies the account of user John Smith.

The identification module 324 may generate corresponding presence data 128 that indicates the presence of a mobile device 104 associated with the particular account has been detected at a particular portal 106. In some implementations, it may be assumed that the mobile device 104 is being carried by the user 102 associated with the particular account.

Figure 4:
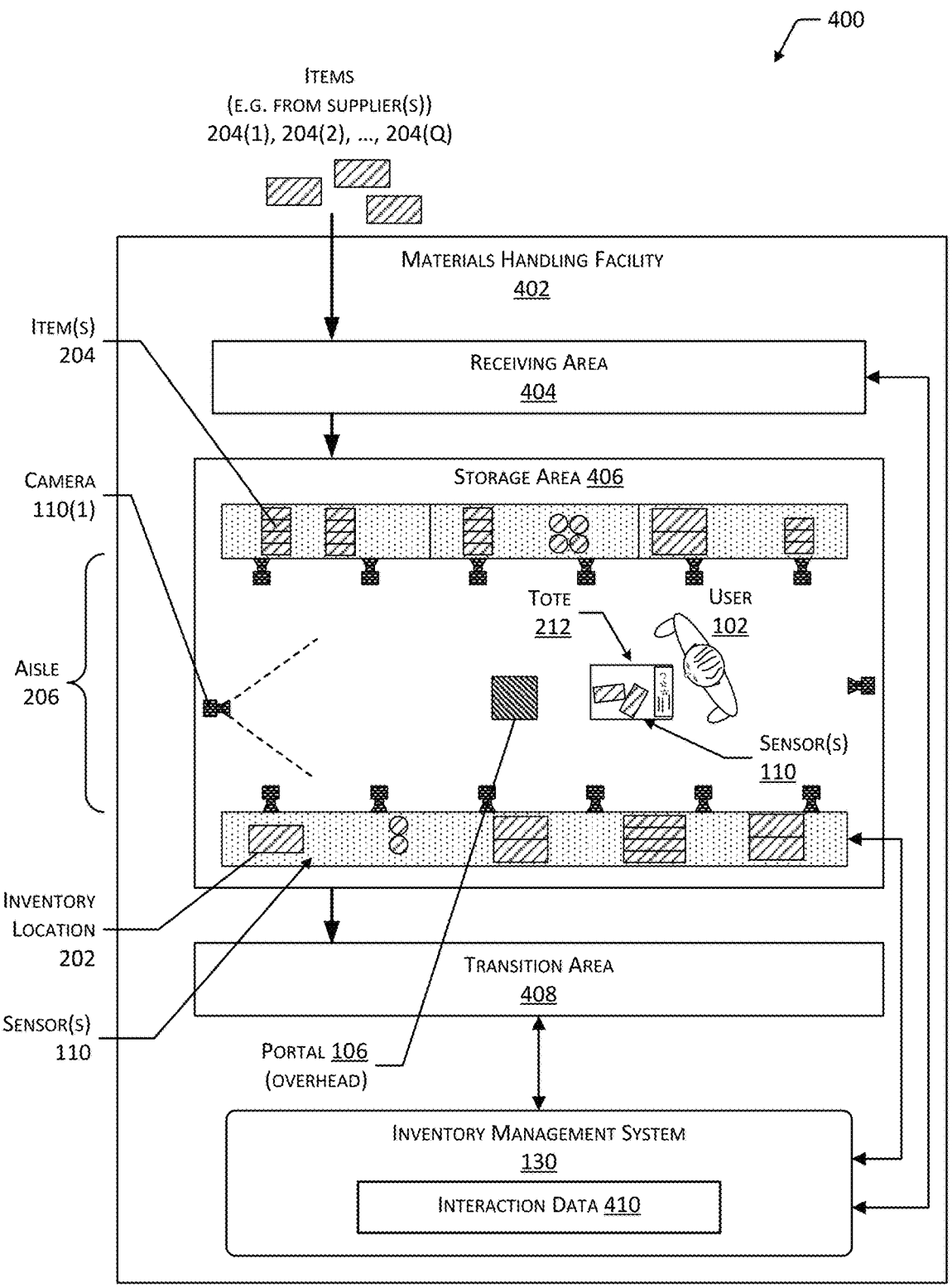
FIG. 4 is a block diagram of a materials handling facility (facility), according to some implementations.

FIG. 4 is a block diagram 400 illustrating a materials handling facility (facility) 402 using the system 100, according to some implementations. A facility 402 comprises one or more physical structures or areas within which one or more items 204(1), 204(2), . . . , 204(Q) may be held. As used in this disclosure, letters in parenthesis such as "(Q)" indicate an integer value greater than or equal to zero. The items 204 may comprise physical goods, such as books, pharmaceuticals, repair parts, electronic gear, and so forth.

The facility 402 may include one or more areas designated for different functions with regard to inventory handling. In this illustration, the facility 402 includes a receiving area 404, a storage area 406, and a transition area 408.

The receiving area 404 may be configured to accept items 204, such as from suppliers, for intake into the facility 402. For example, the receiving area 404 may include a loading dock at which trucks or other freight conveyances unload the items 204. In some implementations, the items 204 may be processed, such as at the receiving area 404, to generate at least a portion of item data. For example, an item 204 may be imaged or otherwise scanned to develop reference images or representations of the item 204 at the receiving area 404.

The storage area 406 is configured to store the items 204. The storage area 406 may be arranged in various physical configurations. In one implementation, the storage area 406 may include one or more aisles 206. The aisle 206 may be configured with, or defined by, inventory locations 202 on one or both sides of the aisle 206. In some implementations, one or more portals 106 may be deployed within the facility 402. For example, a portal 106 may be deployed within an aisle 206 by placing one or more antennas 116 overhead, within the inventory locations 202, on either side of the aisle 206, and so forth.

One or more users 102 and totes 212 or other material handling apparatuses may move within the facility 402. For example, the user 102 may move about within the facility 402 to pick or place the items 204 in various inventory locations 202, placing them on the tote 212 for ease of transport. The tote 212 is configured to carry or otherwise transport one or more items 204. For example, the tote 212 may include a basket, cart, bag, bin, and so forth. In other implementations, other material handling apparatuses such as robots, forklifts, cranes, aerial drones, and so forth, may move about the facility 402 picking, placing, or otherwise moving the items 204. For example, a robot may pick an item 204 from a first inventory location 202(1) and move the item 204 to a second inventory location 202(2).

One or more sensors 110 may be configured to acquire information in the facility 402. The sensors 110 may include, but are not limited to, cameras 110(1), depth sensors 110(2), weight sensors 110(6), optical sensor arrays 110(13), proximity sensors 110(14), and so forth. The sensors 110 may be stationary or mobile, relative to the facility 402. For example, the inventory locations 202 may contain weight sensors 110(6) to acquire weight sensor data of items 204 stowed therein, cameras 110(1) to acquire images of picking or placement of items 204 on shelves, optical sensor arrays 110(13) to detect shadows of the user's hands at the inventory locations 202, and so forth. In another example, the facility 402 may include cameras 110(1) to obtain images of the user 102 or other objects in the facility 402. The sensors 110 are discussed in more detail below with regard to FIG. 5.

While the storage area 406 is depicted as having a single aisle 206, inventory locations 202 storing the items 204, sensors 110, and so forth, it is understood that the receiving area 404, the transition area 408, or other areas of the facility 402 may be similarly equipped. Furthermore, the arrangement of the various areas within the facility 402 is depicted functionally rather than schematically. For example, in some implementations, multiple different receiving areas 404, storage areas 406, and transition areas 408 may be interspersed rather than segregated in the facility 402.

The facility 402 may include, or be coupled to, an inventory management system 130. The inventory management system 130 is configured to interact with users 102 or devices such as sensors 110, robots, material handling equipment, computing devices, and so forth, in one or more of the receiving area 404, the storage area 406, or the transition area 408.

During operation of the facility 402, the sensors 110 may be configured to provide sensor data, or information based on the sensor data, to the inventory management system 130. The sensor data may include image data 122, non-image data, weight sensor data obtained from weight sensors 110(6), and so forth. The sensors 110 are described in more detail below with regard to FIG. 5.

The inventory management system 130 or other systems may use the sensor data to track the location of objects within the facility 402, movement of the objects, or provide other functionality. Objects may include, but are not limited to, items 204, users 102, totes 212, and so forth. For example, a series of images acquired by the camera 110(1) may indicate removal by the user 102 of an item 204 from a particular location on the inventory location 202 and placement of the item 204 on or at least partially within the tote 212.

The facility 402 may be configured to receive different kinds of items 204 from various suppliers and to store them until a customer orders or retrieves one or more of the items 204. A general flow of items 204 through the facility 402 is indicated by the arrows of FIG. 4. Specifically, as illustrated in this example, items 204 may be received from one or more suppliers, such as manufacturers, distributors, wholesalers, and so forth, at the receiving area 404. In various implementations, the items 204 may include merchandise, commodities, perishables, or any suitable type of item 204, depending on the nature of the enterprise that operates the facility 402.

Upon being received from a supplier at the receiving area 404, the items 204 may be prepared for storage in the storage area 406. For example, in some implementations, items 204 may be unpacked or otherwise rearranged. The inventory management system 130 may include one or more software applications executing on a computer system to provide inventory management functions. These inventory management functions may include maintaining information indicative of the type, quantity, condition, cost, location, weight, or any other suitable parameters with respect to the items 204. The items 204 may be stocked, managed, or dispensed in terms of countable units, individual units, or multiple units, such as packages, cartons, crates, pallets, or other suitable aggregations. Alternatively, some items 204, such as bulk products, commodities, and so forth, may be stored in continuous or arbitrarily divisible amounts that may not be inherently organized into countable units. Such items 204 may be managed in terms of a measurable quantity such as units of length, area, volume, weight, time, duration, or other dimensional properties characterized by units of measurement. Generally speaking, a quantity of an item 204 may refer to either a countable number of individual or aggregate units of an item 204 or a measurable amount of an item 204, as appropriate.

After arriving through the receiving area 404, items 204 may be stored within the storage area 406. In some implementations, like items 204 may be stored or displayed together in the inventory locations 202 such as in bins, on shelves, hanging from pegboards, and so forth. In this implementation, all items 204 of a given kind are stored in one inventory location 202. In other implementations, like items 204 may be stored in different inventory locations 202. For example, to optimize retrieval of certain items 204 having frequent turnover within a large physical facility 402, those items 204 may be stored in several different inventory locations 202 to reduce congestion that might occur at a single inventory location 202.

When a customer order specifying one or more items 204 is received, or as a user 102 progresses through the facility 402, the corresponding items 204 may be selected or "picked" from the inventory locations 202 containing those items 204. In various implementations, item picking may range from manual to completely automated picking. For example, in one implementation, a user 102 may have a list of items 204 they desire and may progress through the facility 402 picking items 204 from inventory locations 202 within the storage area 406 and placing those items 204 into a tote 212. In other implementations, employees of the facility 402 may pick items 204 using written or electronic pick lists derived from customer orders. These picked items 204 may be placed into the tote 212 as the employee progresses through the facility 402.

After items 204 have been picked, the items 204 may be processed at a transition area 408. The transition area 408 may be any designated area within the facility 402 where items 204 are transitioned from one location to another or from one entity to another. For example, the transition area 408 may be a packing station within the facility 402. When the item 204 arrives at the transition area 408, the item 204 may be transitioned from the storage area 406 to the packing station. Information about the transition may be maintained by the inventory management system 130.

In another example, if the items 204 are departing the facility 402, a list of the items 204 may be obtained and used by the inventory management system 130 to transition responsibility for, or custody of, the items 204 from the facility 402 to another entity. For example, a carrier may accept the items 204 for transport with that carrier accepting responsibility for the items 204 indicated in the list. In another example, a user 102 may purchase or rent the items 204 and remove the items 204 from the facility 402. During use of the facility 402, the user 102 may move about the facility 402 to perform various tasks, such as picking or placing the items 204 in the inventory locations 202.

To facilitate operation of the facility 402, the inventory management system 130 is configured to use the sensor data including the image data 122 and other information such as the item data, the physical layout data 306, the presence data 128, and so forth, to generate interaction data 410. For example, the presence data 128 may be used to associate a particular user identity with a particular person that is tracked using image data 122 acquired by one or more of the cameras 110(1) in the facility 402.

The interaction data 410 may provide information about an interaction, such as a pick of an item 204 from the inventory location 202, a place of an item 204 to the inventory location 202, a touch made to an item 204 at the inventory location 202, a gesture associated with an item 204 at the inventory location 202, and so forth. The interaction data 410 may include one or more of the type of interaction, interaction location identifier indicative of where from the inventory location 202 the interaction took place, item identifier, quantity change to the item 204, user identifier, and so forth. The interaction data 410 may then be used to further update the item data. For example, the quantity of items 204 on hand at a particular lane on the shelf may be changed based on an interaction that picks or places one or more items 204.

The inventory management system 130 may combine or otherwise utilize data from different sensors 110 of different types to generate the interaction data 410. For example, weight data obtained from weight sensors 110(6) at the inventory location 202 may be used instead of, or in conjunction with, the image data 122 to determine the interaction data 410.

Figure 5:
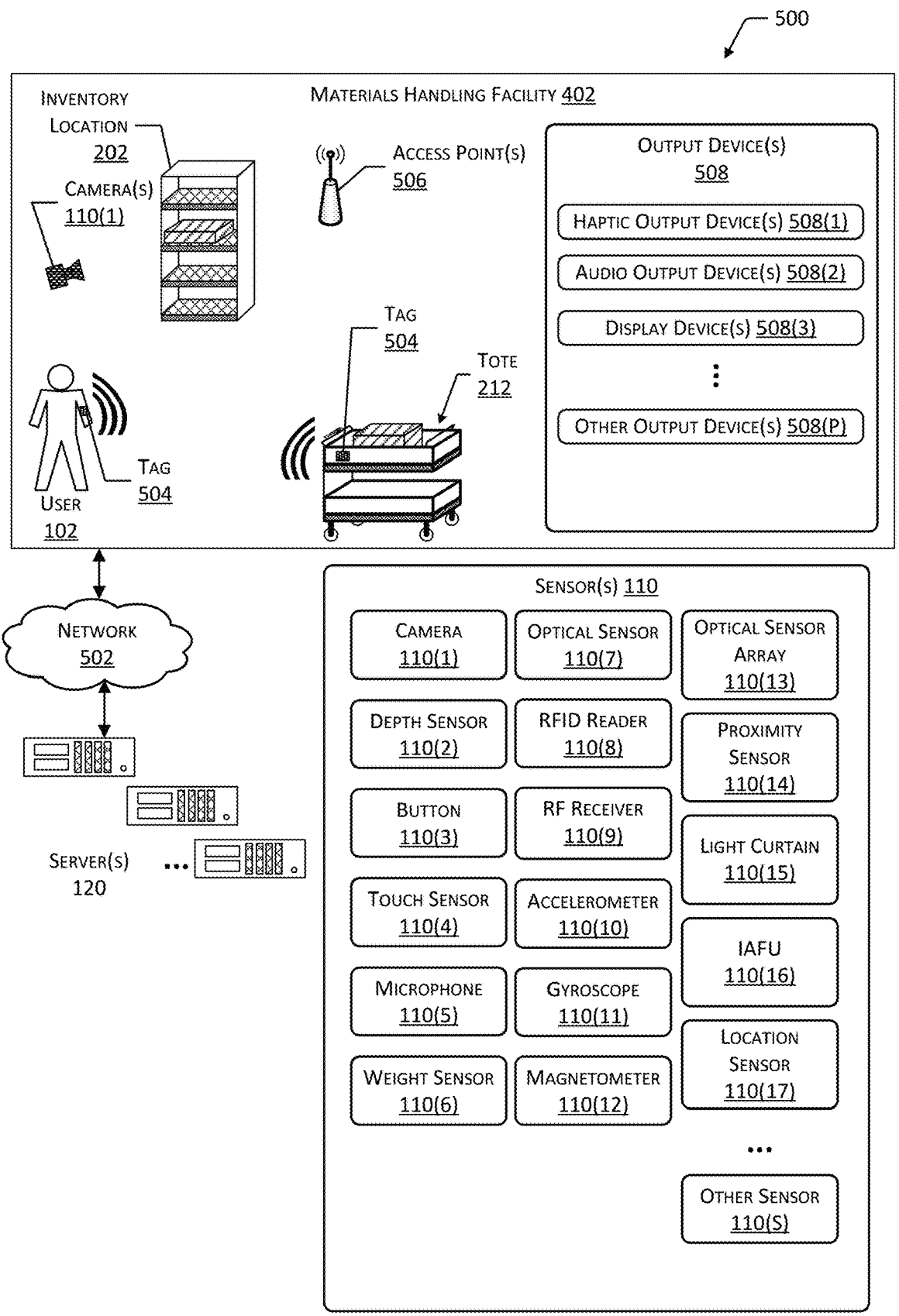
FIG. 5 is a block diagram illustrating additional details of the facility, according to some implementations.

FIG. 5 is a block diagram 500 illustrating additional details of the facility 402, according to some implementations. The facility 402 may be connected to one or more networks 502, which in turn connect to one or more servers 120. The network 502 may include private networks such as an institutional or personal intranet, public networks such as the Internet, or a combination thereof. The network 502 may utilize wired technologies (e.g., wires, fiber optic cables, and so forth), wireless technologies (e.g., radio frequency, infrared, acoustic, optical, and so forth), or other connection technologies. The network 502 is representative of any type of communication network, including one or more of data networks or voice networks. The network 502 may be implemented using wired infrastructure (e.g., copper cable, fiber optic cable, and so forth), a wireless infrastructure (e.g., cellular, microwave, satellite, and so forth), or other connection technologies.

The servers 120 may be configured to execute one or more modules or software applications associated with the inventory management system 130 or other systems. While the servers 120 are illustrated as being in a location outside of the facility 402, in other implementations, at least a portion of the servers 120 may be located at the facility 402. The servers 120 are discussed in more detail below with regard to FIG. 6.

The users 102, the totes 212, or other objects in the facility 402 may be equipped with one or more tags 504. The tags 504 may be configured to emit a signal. In one implementation, the tag 504 may be a radio frequency identification (RFID) tag 504 configured to emit a RF signal upon activation by an external signal. For example, the external signal may comprise a radio frequency signal or a magnetic field configured to energize or activate the RFID tag 504. In another implementation, the tag 504 may comprise a transmitter and a power source configured to power the transmitter. For example, the tag 504 may comprise a Bluetooth Low Energy (BLE) transmitter and battery. In other implementations, the tag 504 may use other techniques to indicate presence of the tag 504. For example, an acoustic tag 504 may be configured to generate an ultrasonic signal, which is detected by corresponding acoustic receivers. In yet another implementation, the tag 504 may be configured to emit an optical signal.

The inventory management system 130 may be configured to use the tags 504 for one or more of identification of the object, determining a location of the object, and so forth. For example, the users 102 may wear tags 504, the totes 212 may have tags 504 affixed, and so forth, which may be read and, based at least in part on signal strength, used to determine identity and location.

Generally, the inventory management system 130 or other systems associated with the facility 402 may include any number and combination of input components, output components, and servers 120.

The one or more sensors 110 may be arranged at one or more locations within the facility 402. For example, the sensors 110 may be mounted on or within a floor, wall, at a ceiling, at an inventory location 202, on a tote 212, may be carried or worn by a user 102, and so forth.

The sensors 110 may include one or more cameras 110(1) or other imaging sensors. The one or more cameras 110(1) may include imaging sensors configured to acquire images of a scene. The cameras 110(1) are configured to detect light in one or more wavelengths including, but not limited to, terahertz, infrared, visible, ultraviolet, and so forth. The cameras 110(1) may comprise charge coupled devices (CCD), complementary metal oxide semiconductor (CMOS) devices, microbolometers, and so forth. The inventory management system 130 may use image data 122 acquired by the cameras 110(1) during operation of the facility 402. For example, the inventory management system 130 may identify items 204, users 102, totes 212, and so forth, based at least in part on their appearance within the image data 122 acquired by the cameras 110(1). The cameras 110(1) may be mounted in various locations within the facility 402. For example, cameras 110(1) may be mounted overhead, on inventory locations 202, may be worn or carried by users 102, may be affixed to totes 212, and so forth.

One or more depth sensors 110(2) may also be included in the sensors 110. The depth sensors 110(2) are configured to acquire spatial or three-dimensional (3D) data, such as depth information, about objects within a field-of-view. The depth sensors 110(2) may include range cameras, lidar systems, sonar systems, radar systems, structured light systems, stereo vision systems, optical interferometry systems, and so forth. The inventory management system 130 may use the 3D data acquired by the depth sensors 110(2) to identify objects, determine a location of an object in 3D real space, and so forth.

One or more buttons 110(3) may be configured to accept input from the user 102. The buttons 110(3) may comprise mechanical, capacitive, optical, or other mechanisms. For example, the buttons 110(3) may comprise mechanical switches configured to accept an applied force from a touch of the user 102 to generate an input signal. The inventory management system 130 may use data from the buttons 110(3) to receive information from the user 102. For example, the tote 212 may be configured with a button 110(3) to accept input from the user 102 and send information indicative of the input to the inventory management system 130.

The sensors 110 may include one or more touch sensors 110(4). The touch sensors 110(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 130 may use data from the touch sensors 110(4) to receive information from the user 102. For example, the touch sensor 110(4) may be integrated with the tote 212 to provide a touchscreen with which the user 102 may select from a menu one or more particular items 204 for picking, enter a manual count of items 204 at an inventory location 202, and so forth.

One or more microphones 110(5) or other acoustic transducers may be configured to acquire information indicative of sound present in the environment. In some implementations, arrays of microphones 110(5) may be used. These arrays may implement beamforming techniques to provide for directionality of gain. The analysis module 124 may use information obtained by a microphone 110(5) or an array of microphones 110(5) to gather portal data 118. For example, the mobile device 104 may emit an ultrasonic signal while the microphones 110(5) positioned at the portal 106 (or elsewhere in the facility 402) generate portal data 118 about the ultrasonic signal. The inventory management system 130 may use the one or more microphones 110(5) to acquire information from acoustic tags 504, accept voice input from the users 102, determine ambient noise level, and so forth.

One or more weight sensors 110(6) are configured to measure the weight of a load, such as the item 204, the tote 212, or other objects. The weight sensors 110(6) may be configured to measure the weight of the load at one or more of the inventory locations 202, the tote 212, on the floor of the facility 402, and so forth. For example, the shelf may include a plurality of lanes or platforms, with one or more weight sensors 110(6) beneath each one to provide weight sensor data about an individual lane or platform. The weight sensors 110(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 110(6) may operate as transducers that generate one or more signals based on an applied force, such as that of the load due to gravity. For example, the weight sensor 110(6) may comprise a load cell having a strain gauge and a structural member that deforms slightly when weight is applied. By measuring a change in the electrical characteristic of the strain gauge, such as capacitance or resistance, the weight may be determined. In another example, the weight sensor 110(6) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 130 may use the data acquired by the weight sensors 110(6) to identify an object, determine a change in the quantity of objects, determine a location of an object, maintain shipping records, and so forth.

The sensors 110 may include one or more optical sensors 110(7). The optical sensors 110(7) may be configured to provide data indicative of one or more of color or intensity of light impinging thereupon. For example, the optical sensor 110(7) may comprise a photodiode and associated circuitry configured to generate a signal or data indicative of an incident flux of photons. As described below, the optical sensor array 110(13) may comprise a plurality of the optical sensors 110(7). For example, the optical sensor array 110 (13) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 110(7) may be used. The optical sensors 110(7) may be sensitive to one or more of infrared light, visible light, or ultraviolet light. The optical sensors 110(7) may include photodiodes, photoresistors, photovoltaic cells, quantum dot photoconductors, bolometers, pyroelectric infrared detectors, and so forth. For example, the optical sensor 110(7) may use germanium photodiodes to detect infrared light.

One or more radio frequency identification (RFID) readers 110(8), near field communication (NFC) systems, and so forth, may be included as sensors 110. For example, the RFID readers 110(8) may be configured to read the RF tags 504. Information acquired by the RFID reader 110(8) may be used by the inventory management system 130 to identify an object associated with the RF tag 504 such as the item 204, the user 102, the tote 212, and so forth. For example, based on information from the RFID readers 110(8) detecting the RF tag 504 at different times and RFID readers 110(8) having different locations in the facility 402, a velocity of the RF tag 504 may be determined.

One or more RF receivers 110(9) may also be included as sensors 110. In some implementations, the RF receivers 110(9) may be part of transceiver assemblies. The RF receivers 110(9) may be configured to acquire RF signals associated with Wi-Fi, Bluetooth, ZigBee, 5G, 4G, 3G, LTE, or other wireless data transmission technologies. The RF receivers 110(9) may provide information associated with data transmitted via radio frequencies, signal strength of RF signals, and so forth. For example, information from the RF receivers 110(9) may be used by the inventory management system 130 to determine a location of an RF source, such as a communication interface onboard the tote 212.

The sensors 110 may include one or more accelerometers 110(10), which may be worn or carried by the user 102, mounted to the tote 212, and so forth. The accelerometers 110(10) may provide information such as the direction and magnitude of an imposed acceleration. Data such as rate of acceleration, determination of changes in direction, speed, and so forth, may be determined using the accelerometers 110(10).

A gyroscope 110(11) may provide information indicative of rotation of an object affixed thereto. For example, the tote 212 or other objects may be equipped with a gyroscope 110(11) to provide data indicative of a change in orientation of the object.

A magnetometer 110(12) may be used to determine an orientation by measuring ambient magnetic fields, such as the terrestrial magnetic field. The magnetometer 110(12) may be worn or carried by the user 102, mounted to the tote 212, and so forth. For example, the magnetometer 110(12) mounted to the tote 212 may act as a compass and provide information indicative of which direction the tote 212 is oriented.

An optical sensor array 110(13) may comprise one or more optical sensors 110(7). The optical sensors 110(7) may be arranged in a regular, repeating, or periodic two-dimensional arrangement such as a grid. The optical sensor array 110(13) may generate image data 122. For example, the optical sensor array 110(13) may be arranged within or below an inventory location 202 and obtain information about shadows of items 204, hand of the user 102, and so forth.

The sensors 110 may include proximity sensors 110(14) used to determine presence of an object, such as the user 102, the tote 212, and so forth. The proximity sensors 110(14) may use optical, electrical, ultrasonic, electromagnetic, or other techniques to determine a presence of an object. In some implementations, the proximity sensors 110(14) may use an optical emitter and an optical detector to determine proximity. For example, an optical emitter may emit light, a portion of which may then be reflected by the object back to the optical detector to provide an indication that the object is proximate to the proximity sensor 110(14). In other implementations, the proximity sensors 110(14) may comprise a capacitive proximity sensor 110(14) configured to provide an electrical field and determine a change in electrical capacitance due to presence or absence of an object within the electrical field.

The proximity sensors 110(14) may be configured to provide sensor data indicative of one or more of a presence or absence of an object, a distance to the object, or characteristics of the object. An optical proximity sensor 110(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 110 such as a camera 110(1). Based on an apparent distance between the features of the structured light pattern, the distance to the object may be calculated. Other techniques may also be used to determine distance to the object. In another example, the color of the reflected light may be used to characterize the object, such as skin, clothing, tote 212, and so forth.

The sensors 110 may include a light curtain 110(15) that utilizes a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the inventory location 202, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 102 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 102 and the sheet of infrared light. In some implementations, a pair of light curtains 110(15) may be arranged at right angles relative to one another to provide two-dimensional touchpoint data indicative of a position of touch in a plane. Input from the light curtain 110(15), such as indicating occlusion from a hand of a user 102 may be used to trigger acquisition or selection of image data 122 for processing by the inventory management system 130.

The sensors 110 may include an instrumented auto-facing unit (IAFU) 110(16). The IAFU 110(16) may comprise a position sensor or encoder configured to provide data indicative of displacement of a pusher. As an item 204 is removed from the IAFU 110(16), the pusher moves, such as under the influence of a spring, and pushes the remaining items 204 in the IAFU 110(16) to the front of the inventory location 202. By using data from the position sensor, and given item data such as a depth of an individual item 204, a count may be determined, based on a change in position data. For example, if each item 204 is 1 inch deep, and the position data indicates a change of 5 inches, the quantity held by the IAFU 110(16) may have changed by 5 items 204. This count information may be used to confirm or provide a cross check for a count obtained by other means, such as analysis of the image data 122.

A location sensor 110(17) may be configured to provide information such as geographic coordinates, speed, heading, and so forth. The location sensor 110(17) may comprise a radio navigation-based system, such as a terrestrial or satellite-based navigational system. Satellite-based navigational systems may include a GPS receiver, a Global Navigation Satellite System (GLONASS) receiver, a Galileo receiver, a BeiDou Navigation Satellite System (BDS) receiver, an Indian Regional Navigational Satellite System, and so forth.

The sensors 110 may include other sensors 110(S) as well. For example, the other sensors 110(S) may include ultrasonic rangefinders, thermometers, barometric sensors, hygrometers, and so forth. For example, the inventory management system 130 may use information acquired from thermometers and hygrometers in the facility 402 to direct the user 102 to check on delicate items 204 stored in a particular inventory location 202, which is overheating, too dry, too damp, and so forth.

In some implementations, the camera 110(1) or other sensors 110(S) may include hardware processors, memory, and other elements configured to perform various functions. For example, the cameras 110(1) may be configured to generate image data 122, send the image data 122 to another device such as the server 120, and so forth.

The facility 402 may include one or more access points 506 configured to establish one or more wireless networks. The access points 506 may use Wi-Fi, NFC, Bluetooth, or other technologies to establish wireless communications between a device and the network 502. The wireless networks allow the devices to communicate with one or more of the sensors 110, the inventory management system 130, the optical sensor arrays 110(13), the tags 504, a communication device of the tote 212, or other devices.

Output devices 508 may also be provided in the facility 402. The output devices 508 are configured to generate signals, which may be perceived by the user 102 or detected by the sensors 110. In some implementations, the output devices 508 may be used to provide illumination of the optical sensor array 110(13), light curtain 110(15), and so forth.

Haptic output devices 508(1) are configured to provide a signal that results in a tactile sensation to the user 102. The haptic output devices 508(1) may use one or more mechanisms such as electrical stimulation or mechanical displacement to provide the signal. For example, the haptic output devices 508(1) may be configured to generate a modulated electrical signal, which produces an apparent tactile sensation in one or more fingers of the user 102. In another example, the haptic output devices 508(1) may comprise piezoelectric or rotary motor devices configured to provide a vibration, which may be felt by the user 102.

One or more audio output devices 508(2) may be configured to provide acoustic output. The acoustic output includes one or more of infrasonic sound, audible sound, or ultrasonic sound. The audio output devices 508(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output. In another example, a location of the mobile device 104 in the facility 402 may be determined based on device data 112 indicative of ultrasonic sound emitted by audio output devices 508(2) positioned within the facility 402.

The display devices 508(3) may be configured to provide output, which may be seen by the user 102 or detected by a light-sensitive sensor such as a camera 110(1) or an optical sensor 110(7). In some implementations, the display devices 508(3) may be configured to produce output in one or more of infrared, visible, or ultraviolet light. The output may be monochrome or in color. The display devices 508(3) may be one or more of emissive, reflective, microelectromechanical, and so forth. An emissive display device 508(3), such as using LEDs, is configured to emit light during operation. In comparison, a reflective display device 508(3), such as using an electrophoretic element, relies on ambient light to present an image. Backlights or front lights may be used to illuminate non-emissive display devices 508(3) to provide visibility of the output in conditions where the ambient light levels are low.

The display devices 508(3) may be located at various points within the facility 402. For example, the addressable displays may be located on inventory locations 202, totes 212, on the floor of the facility 402, and so forth.

Other output devices 508(P) may also be present. For example, the other output devices 508(P) may include scent/odor dispensers, document printers, 3D printers or fabrication equipment, and so forth.

Figure 6:
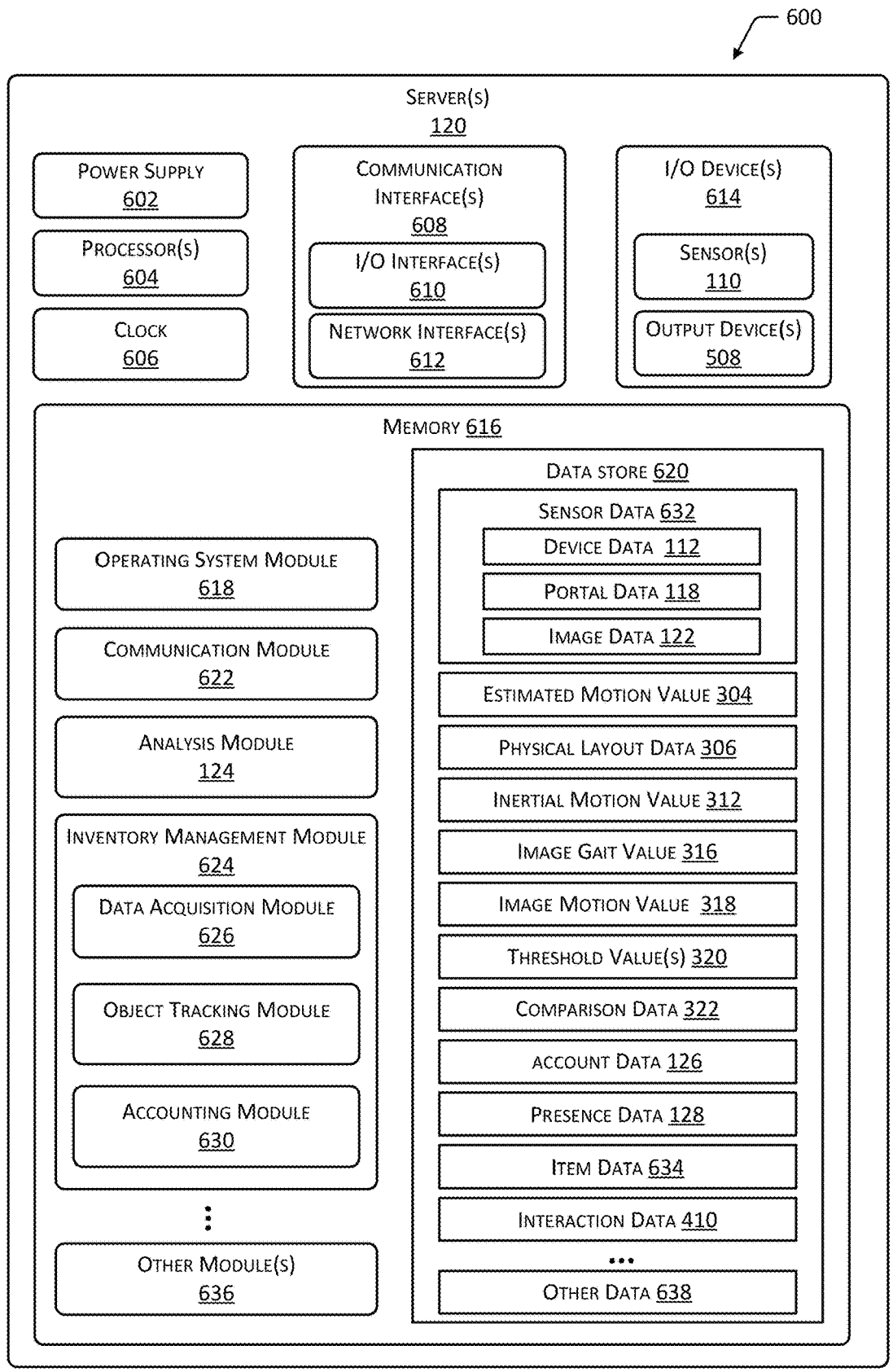
FIG. 6 illustrates a block diagram of a server configured to support operation of the facility, according to some implementations.

FIG. 6 illustrates a block diagram 600 of a server 120 configured to support operation of the facility 402, according to some implementations. The server 120 may be physically present at the facility 402, may be accessible by the network 502, or a combination of both. The server 120 does not require end-user knowledge of the physical location and configuration of the system that delivers the services. Common expressions associated with the server 120 may include "on-demand computing", "software as a service (SaaS)", "platform computing", "network-accessible platform", "cloud services", "data centers", and so forth. Services provided by the server 120 may be distributed across one or more physical or virtual devices.

One or more power supplies 602 may be configured to provide electrical power suitable for operating the components in the server 120. The one or more power supplies 602 may comprise batteries, capacitors, fuel cells, photovoltaic cells, wireless power receivers, conductive couplings suitable for attachment to an external power source such as provided by an electric utility, and so forth. The server 120 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The server 120 may include one or more communication interfaces 608 such as input/output (I/O) interfaces 610, network interfaces 612, and so forth. The communication interfaces 608 enable the server 120, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 110, keyboard, mouse, scanner, and so forth. The I/O devices 614 may also include output devices 508 such as one or more of a display device 508(3), printer, audio speakers, and so forth. In some embodiments, the I/O devices 614 may be physically incorporated with the server 120 or may be externally placed.

The network interfaces 612 may be configured to provide communications between the server 120 and other devices, such as the totes 212, routers, access points 506, and so forth. The network interfaces 612 may include devices configured to couple to personal area networks (PANs), local area networks (LANs), wireless local area networks (WLANS), wide area networks (WANs), and so forth. For example, the network interfaces 612 may include devices compatible with Ethernet, Wi-Fi, Bluetooth, ZigBee, and so forth.

The server 120 may also include one or more buses or other internal communications hardware or software that allow for the transfer of data between the various modules and components of the server 120.

As shown in FIG. 6, the server 120 includes one or more memories 616. The memory 616 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 616 provides storage of computer-readable instructions, data structures, program modules, and other data for the operation of the server 120. A few example functional modules are shown stored in the memory 616, although the same functionality may alternatively be implemented in hardware, firmware, or as a system on a chip (SoC).

The memory 616 may include at least one operating system (OS) module 618. The OS module 618 is configured to manage hardware resource devices such as the I/O interfaces 610, the I/O devices 614, the communication interfaces 608, and provide various services to applications or modules executing on the processors 604. The OS module 618 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 616 may be a data store 620 and one or more of the following modules. These modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including the servers 120, network attached storage devices, and so forth.

A communication module 622 may be configured to establish communications with one or more of the totes 212, sensors 110, display devices 508(3), other servers 120, or other devices. The communications may be authenticated, encrypted, and so forth.

The memory 616 may store the analysis module 124. The functions of the analysis module 124 are described above with regard to FIG. 3. The analysis module 124 may store information described above with regard to FIG. 3 at least in part in the data store 620.

The memory 616 may also store an inventory management module 624. The inventory management module 624 is configured to provide the inventory functions as described herein with regard to the inventory management system 130. For example, the inventory management module 624 may track items 204 between different inventory locations 202, to and from the totes 212, and so forth. The inventory management module 624 may include a data acquisition module 626, object tracking module 628 and accounting module 630.

The analysis module 124 and the inventory management module 624 may access sensor data 632. The sensor data 632 may be stored at least in part in the data store 620. The sensor data 632 comprises information acquired by one or more of the sensors 110. For example, the sensor data 632 may include one or more of device data 112, portal data 118, image data 122, or data acquired by other sensors 110.

The data acquisition module 626 may be configured to acquire and access information associated with operation of the facility 402. For example, the data acquisition module 626 may be configured to acquire sensor data 632, such as the image data 122, from one or more of the sensors 110.

Processing of sensor data 632, such as the image data 122, may be performed by a module implementing, at least in part, one or more of the following tools or techniques. In one implementation, processing of the image data 122 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 632. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 632 or other data. For example, the ANN may be a trained using a supervised learning algorithm such that object identifiers are associated with images of particular objects within training images provided to the ANN. Once trained, the ANN may be provided with the sensor data 632 such as the image data 122 to generate identification data of an object.

The object tracking module 628 may be used to track one or more of the users 102, the items 204, and so forth. The object tracking module 628 may use image data 122 acquired from cameras 110(1) throughout the facility 402 to determine a location of the user 102 at a particular time. As described above, the presence data 128 may be used to determine presence of the user 102 at a particular portal 106. The object tracking module 628 may use the image data 122 or other sensor data 632 to track movement of the items 204. For example, item data 634 comprising previously trained ANNs, dimensional information, barcodes, text, or other information about the items 204 may be accessed and used to identify and track movement of the items 204 at the facility 402.

The accounting module 630 may be configured to assess charges to accounts associated with particular users 102 or other entities. For example, the interaction data 410 may indicate that the user 102 has removed a particular item 204 from an inventory location 202. Based on the interaction data 410, the accounting module 630 may assess the charge to a payment instrument associated with the account.

Other modules 636 may also be present in the memory 616 as well as other data 638 in the data store 620.

Figure 7:
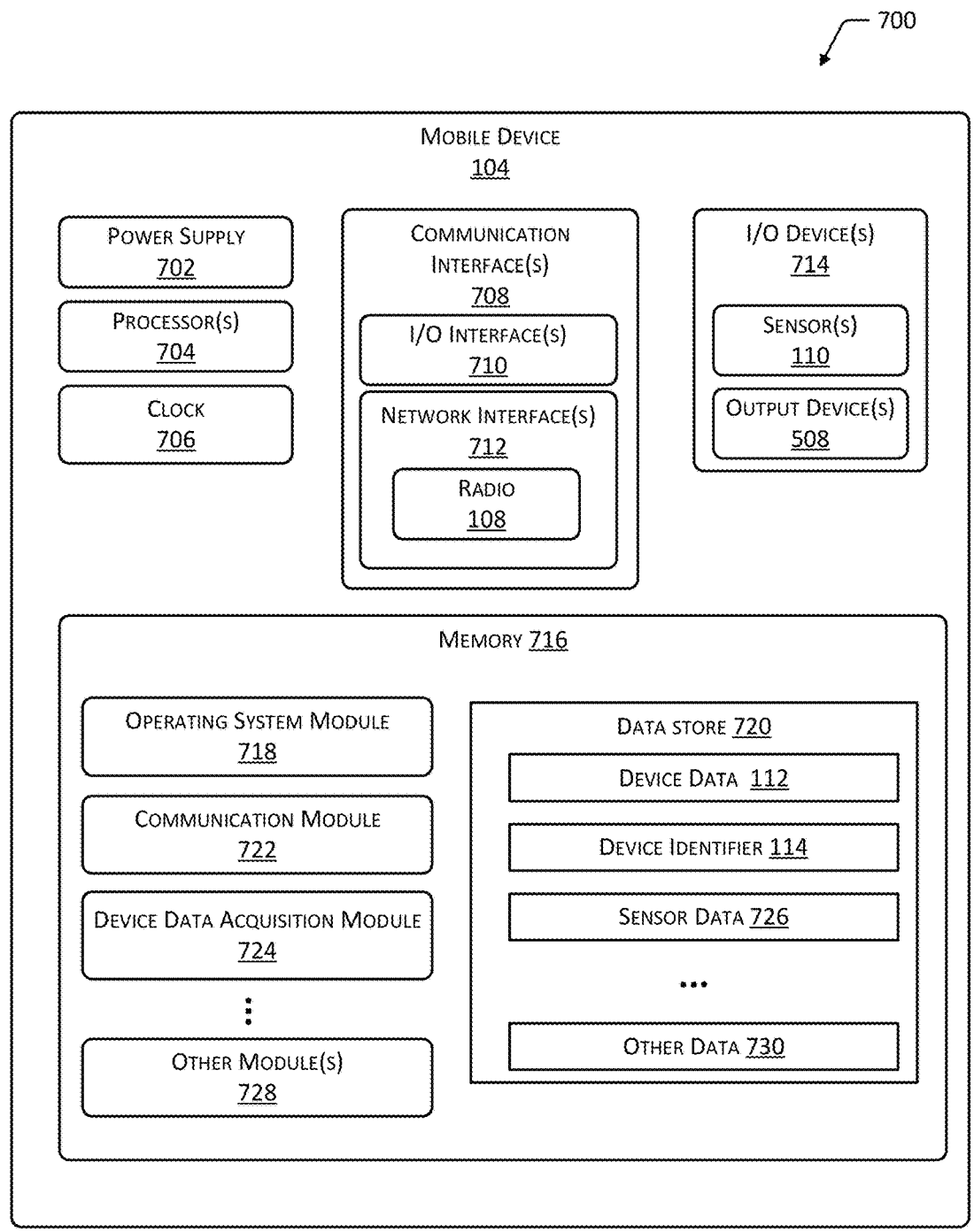
FIG. 7 illustrates a block diagram of a mobile device configured to participate with operation of the portal, according to some implementations.

FIG. 7 illustrates a block diagram 700 of a mobile device 104 configured to participate with operation of the portal 106, according to some implementations.

The mobile device 104 may include one or more power supplies 702. The mobile device 104 may include one or more hardware processors 704 (processors) configured to execute one or more stored instructions. The processors 704 may comprise one or more cores. One or more clocks 706 may provide information indicative of date, time, ticks, and so forth. For example, the processor 704 may use data from the clock 706 to associate a particular interaction with a particular point in time.

The mobile device 104 may include one or more communication interfaces 708 such as I/O interfaces 710, network interfaces 712, and so forth. The communication interfaces 708 enable the mobile device 104, or components thereof, to communicate with other devices or components. The communication interfaces 708 may include one or more I/O interfaces 710. The I/O interfaces 710 may comprise I2C, SPI, USB, RS-232, and so forth.

The I/O interface(s) 710 may couple to one or more I/O devices 714. The I/O devices 714 may include input devices such as one or more of a sensor 110, keyboard, mouse, scanner, and so forth. The I/O devices 714 may also include output devices 508 such as one or more of a display device 508(3), printer, audio speakers, and so forth. In some embodiments, the I/O devices 714 may be physically incorporated with the mobile device 104 or may be externally placed.

The network interfaces 712 may be configured to provide communications between the mobile device 104, the portal 106, the totes 212, routers, access points 506, and so forth. The network interfaces 712 may include devices configured to couple to PANs, LANs, WLANS, WANs, and so forth. For example, the network interfaces 712 may include devices compatible with Ethernet, Wi-Fi, Bluetooth, ZigBee, and so forth. A wireless network interface 712 may include one or more radios 108.

The mobile device 104 may also include one or more buses or other internal communications hardware or software that allow for the transfer of data between the various modules and components of the mobile device 104.

As shown in FIG. 7, the mobile device 104 includes one or more memories 716. The memory 716 may comprise one or more non-transitory CRSM. The memory 716 provides storage of computer-readable instructions, data structures, program modules, and other data for the operation of the mobile device 104. A few example functional modules are shown stored in the memory 716, although the same functionality may alternatively be implemented in hardware, firmware, or as a SoC.

The memory 716 may include at least one OS module 718. The OS module 718 is configured to manage hardware resource devices such as the I/O interfaces 710, the I/O devices 714, the communication interfaces 708, and provide various services to applications or modules executing on the processors 704. The OS module 718 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 716 may be a data store 720 and one or more of the following modules. These modules may be executed as foreground applications, background tasks, daemons, and so forth. The data store 720 may use a flat file, database, linked list, tree, executable code, script, or other data structure to store information. In some implementations, the data store 720 or a portion of the data store 720 may be distributed across one or more other devices including the servers 120, network attached storage devices, and so forth.

A communication module 722 may be configured to establish communications with one or more of the totes 212, sensors 110, display devices 508(3), other servers 120, or other devices. The communications may be authenticated, encrypted, and so forth.

The memory 716 may store a device data acquisition module 724. The device data acquisition module 724 may be configured to generate device data 112. The device data acquisition module 724 may access sensor data 726 provided by the sensors 110 on board the mobile device 104, or associated with the mobile device 104. For example, the device data acquisition module 724 may access accelerometer data from a fitness tracking device in communication with the mobile device 104 and compass data acquired by the magnetometer 110(12) on the mobile device 104.

The device data acquisition module 724 may be configured to send one or more of the device data 112 or the device identifier 114. For example, the device data acquisition module 724 may receive data indicating a portal signal has been received by the radio 108 of the mobile device 104. The device data acquisition module 724 may be configured to send the device data 112 stored in the data store 720 to the communication module 722 for transmission by the radio 108. The packet transmitted by the mobile device 104 may include a header that indicates the device identifier 114 while the payload comprises the device data 112. This transmission may be the device signal that is received by the radio 108 of the portal 106. In some implementations, the transmission may be made as a broadcast. For example, the device data 112 may be sent as a Bluetooth broadcast.

In some implementations, the device data acquisition module 724 may send the device data 112 to the server 120. For example, the device data acquisition module 724 may establish a connection with the server 120 and send the device data 112 using the connection.

The device data acquisition module 724 may send the device data 112 responsive to input of one or more other sensors 110, data received by way of a communication interface 708, and so forth. In one implementation, the location sensor 110(17) may provide location information that indicates the mobile device 104 has traversed a predefined geographic location. For example, location data provided by the location sensor 110(17) may indicate that the mobile device 104 has entered the facility 402. Responsive to this determination, device data 112 may be transmitted to the server 120.

Other modules 728 may also be present in the memory 716 as well as other data 730 in the data store 720. For example, the other modules 728 may include an application to present a pick list to the user 102 for picking at the facility 402.

Illustrative Processes

Figure 8:
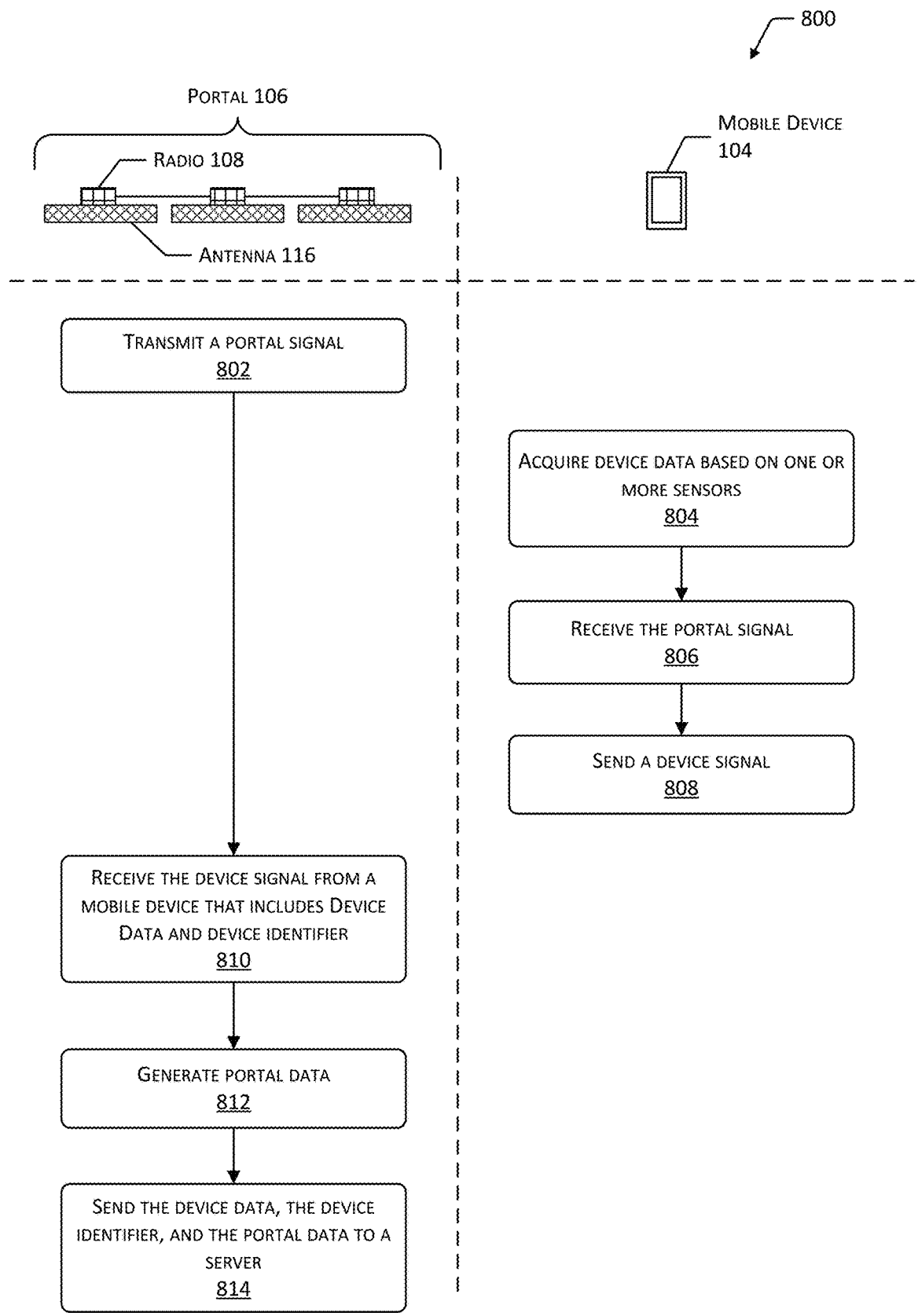
FIG. 8 depicts a flow diagram of a process of a portal interacting with a mobile device, according to some implementations.

FIG. 8 depicts a flow diagram of a process 800 of a portal 106 interacting with a mobile device 104, according to some implementations. In some implementations, the process 800 may be implemented at least in part by one or more of the mobile device 104, the portal 106, or the server 120. In this illustration, operations performed by the portal 106 are depicted to the left of the page, while operations performed by the mobile device 104 are depicted to the right of the page.

At 802, a radio 108 of the portal 106 transmits a portal signal. For example, the transmitter of the radio 108 may generate the portal signal which is then emitted from one or more of the antennas 116. The portal signal may be used to transfer information to a mobile device 104 that is within range. For example, the portal signal may be used to transmit a digital certificate or other cryptographic credentials that may be used to authenticate or identify the portal 106. In some implementations, the portal signal may be transmitted as part of a device pairing process, a connection, a connectionless broadcast, and so forth. In other implementations, other devices may generate the portal signal. For example, a magnet may generate a magnetic field, an ultrasonic transducer may emit ultrasonic sound, an infrared emitter may generate an infrared signal, and so forth. In other implementations, the portal 106 may not transmit a portal signal 802.

The portal signal 802 may include beacons or other signals generated by devices associated with the facility 402 but separate from the portal 106. For example, the facility 402 may have devices to generate BLE beacons or Wi-Fi broadcasts that are transmitted within the facility 402, outside of an entrance to the portal 106, and so forth.

At 804, the device data acquisition module 724 of the mobile device 104 acquires device data 112 based on information from one or more of the sensors 110 associated with the mobile device 104. For example, the device data acquisition module 724 may acquire one or more of accelerometer data from the accelerometer 110(10), rotational data from the gyroscope 110(11), or magnetometer data from the magnetometer 110(12) on board the mobile device 104. In some implementations, acquisition of the device data 112 may be responsive to the receipt of the portal signal described next. In other implementations, acquisition of the device data 112 may be responsive to traversing a particular geographic location, such as entering a geo-fenced area.

At 806, the mobile device 104 receives the portal signal. For example, a receiver of the radio 108 in the mobile device 104 may be used to receive the portal signal.

At 808, the mobile device 104 sends a device signal. The sending of the device signal may be responsive to receipt of the portal signal. In one implementation, the device signal may comprise the device data 112 and the device identifier 114. In another implementation, the device signal may comprise the device identifier 114. In some implementations, the device data 112 may be sent to the server 120 using a connection between the mobile device 104 and the server 120. For example, the mobile device 104 may establish a connection with the server 120 that is independent of the systems at the portal 106.

In other implementations, the device signal may be sent by the mobile device 104 based on one or more other factors. As described above, the device signal may be sent in response to receipt of a portal signal. In another example, the mobile device 104 may send the device signal periodically. In yet another example, the mobile device 104 may send the device signal after determining a location that is within or past a specified geolocation, such as a geofence boundary.

At 810, the portal 106 receives the device signal from the mobile device 104 using a receiver of the radio 108 at the portal 106. As described above, the device signal may include one or more of the device data 112 or the device identifier 114.

At 812, the portal 106 generates the portal data 118. The portal data 118 may be indicative of one or more of received signal strength of the device signal or information indicative of the specified volume covered by the antenna 116. For example, this may comprise coordinates associated with the volume, an angular bearing and distance, and so forth. As described above, an antenna 116 may have a particular gain pattern that is designed to cover a specified three-dimensional volume within the portal 106. In some implementations, the information indicative of the specified volume may comprise an antenna identifier indicative of the antenna 116 that was used to acquire the device signal. The antenna identifier may then be used to retrieve information such as coordinates describing the specified volume, specifications that describe the gain, and so forth.

At 814, one or more of the device data 112, the device identifier 114, or the portal data 118 may be sent to a server 120. For example, the network interface of the portal 106 may be used to transfer this information to the server 120 using the network 502.

Figure 9:
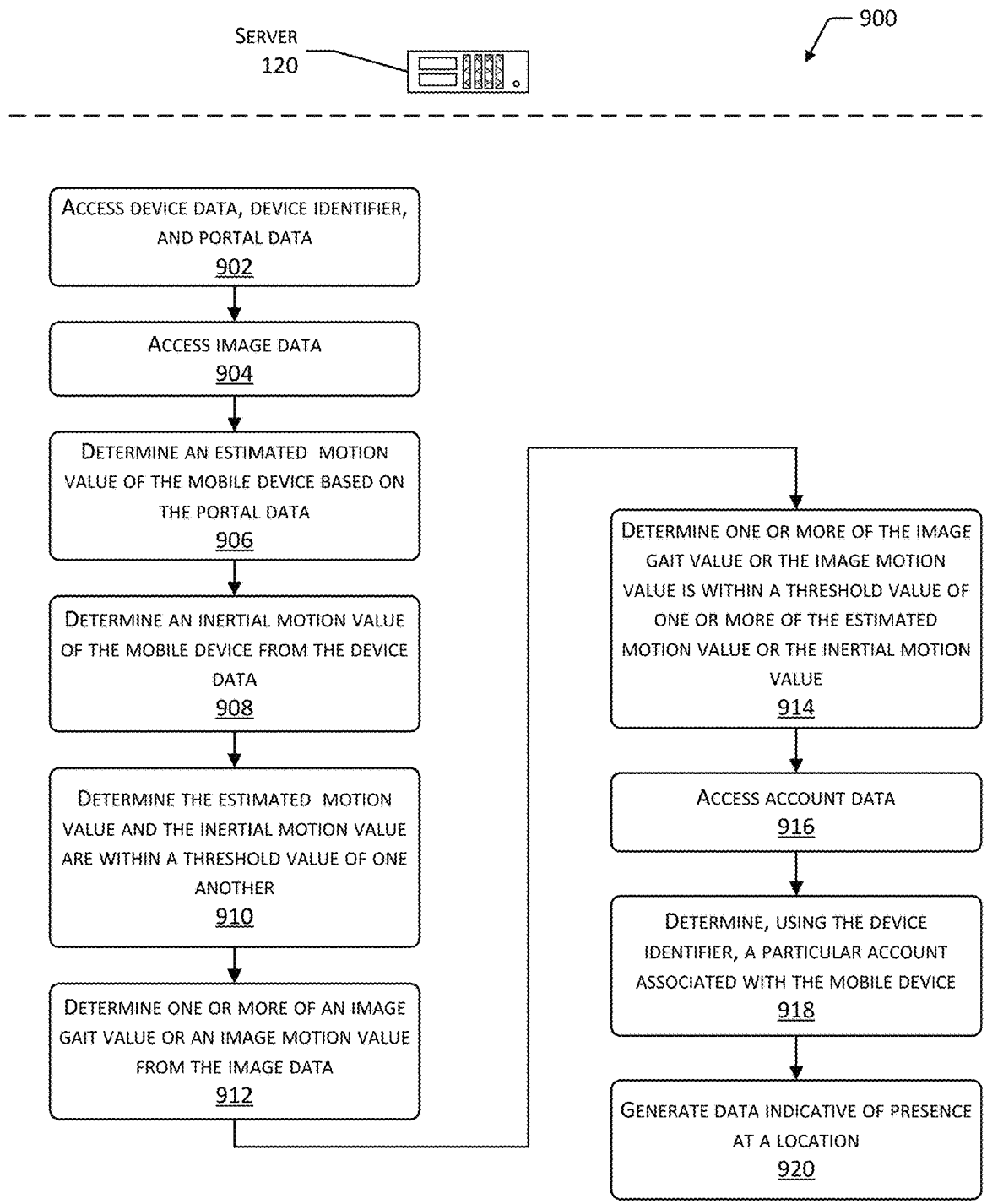
FIG. 9 depicts a flow diagram of a process of a server generating data indicative of presence of a particular user at a portal, according to some implementations.

FIG. 9 depicts a flow diagram of a process 900 of a server 120 generating data indicative of presence of a particular user 102 at a portal 106, according to some implementations. In the implementation depicted here, the operations are performed at least in part by the server 120. In some implementations, the process may be implemented at least in part by one or more of the mobile device 104, the portal 106, or the server 120.

At 902, one or more of the device data 112, device identifier 114, or portal data 118 are accessed. For example, this information may be received from one or more of the portal 106 or the mobile device 104 as part of the process of sending the portal signal and receiving a device signal. The antennas 116 of the portal 106 may cover a specified volume of the portal 106.

In some implementations, at 904, image data 122 may be accessed. For example, the camera 110(1) having a field-of-view that encompasses at least a portion of the portal 106 may generate and send the image data 122 to the server 120. The portion within the field-of-view may include at least a part of the specified volume. The image data 122 may include an image of the user 102 in the portal 106.

At 906, an estimated motion value 304 of the mobile device 104 based on the portal data 118 is determined. For example, the estimated motion value 304 may comprise a vector or trajectory based on the information obtained by the portal 106 about the device signal. In one implementation, the estimated motion value 304 comprises one or more vector values, where individual ones of the vector values are indicative of a direction of motion and a speed during a particular interval of time of the mobile device 104.

In some implementations, the antennas 116 that acquire the portal data 118 may be directional such that they provide gain in a particular direction. The portal data 118 may be obtained from a first directional antenna 116(1) and a second directional antenna 116(2) at a first time and a second time. In some implementations, the portal data 118 may include information indicative of the particular antenna 116 that was used to receive the device signal or other signals from the mobile device 104. Antenna coverage data may be accessed that indicates the specified volume in the facility 402 covered by the first directional antenna 116(1) and the second directional antenna 116(2). For example, antenna identifier data indicative of the first directional antenna 116(1) may be associated with the left side of portal 106 while the antenna identifier indicative of the second directional antenna 116(2) is associated with the right side of portal 106.

A first estimated RF location may be determined based on the antenna coverage data and the received signal strength of the device signal as measured at the first directional antenna 116(1) and the second directional antenna 116(2) at the first time. A second estimated RF location may be determined based on the antenna coverage data and the received signal strength of the device signal as measured at the first directional antenna 116(1) and the second directional antenna 116(2) at the second time. The estimated motion value 304 may be determined based on the first estimated RF location at the first time and the second estimated RF location at the second time.

In one implementation, the portal data 118 may include a first received signal strength of a first device signal as received using a first directional antenna 116(1) at a first time. The portal data 118 may also include a second received signal strength of a second device signal as received using the first directional antenna 116(1) at a second time. A first estimated distance between the mobile device 104 and the first directional antenna 116(1) may be determined using the first received signal strength. For example, a particular received signal strength may be associated with a particular linear distance. A second estimated distance may be determined between the mobile device 104 and the first directional antenna 116(1) using the second received signal strength. Antenna coverage data may be accessed that is indicative of the specified volume in the facility 402 that is covered by the first directional antenna 116(1). The antenna coverage data may also include the location and orientation of the antenna 116 in the facility 402. For example, the antenna coverage data may indicate that the first directional antenna 116(1) is located on a right side of the portal 106 and exhibits primary gain along a right side or lane of the portal 106. A first estimated location of the mobile device 104 may be determined at the first time based on the antenna coverage data and the first estimated distance. For example, given the known gain pattern of the antenna 116 and the estimated distance, a location within the facility 402 may be determined. A second estimated location of the mobile device 104 at the second time may also be determined based on the antenna coverage data and the second estimated distance. A direction of motion of the mobile device 104 may be determined based on a comparison between the first estimated location and the second estimated location. A movement distance may be determined that indicates a distance between the first estimated location of the mobile device 104 and the second estimated location of the mobile device 104. An interval of time between the first and second time may be determined. For example, a value indicative of the first time may be subtracted from a value indicative of the second time. A speed of the mobile device 104 may be determined by dividing the movement distance by the interval of time. The estimated motion value may comprise the direction of motion and the speed.

In another implementation, antennas 116 may provide information about an angular bearing to the source of a signal. For example, an electronically steerable phased array antenna 116 may have the phasing between a plurality of elements adjusted to electronically "sweep" or move the direction of gain. An angular bearing at which the received signal strength is greatest may be deemed to be indicative of the direction at which the transmitter of that signal is located. By using the angular bearing from two or more physically separate steerable phased array antennas 116 at known locations that detect the signal at approximately the same time, the location may be determined at the point where those two angular bearings intersect. In further implementations, the signal strength data from each of the steerable phased array antennas 116 may also be used to determine approximate distance.

At 908, an inertial motion value 312 of the mobile device 104 is determined from the device data 112. For example, the inertial motion value 312 may comprise a vector or trajectory based on the accelerometer data, gyroscope data, and magnetometer data. In one implementation, the inertial motion value 312 may comprise one or more vector values, individual ones of the vector values indicative of a direction of motion and a speed during a particular interval of time of the mobile device 104.

At 910, the estimated motion value 304 and the inertial motion value 312 are determined to be within a threshold value 320 of one another. For example, the two values may be compared and deemed to represent the same trajectory.

At 912, one or more of an image gait value 316 or image motion value 318 may be determined from the image data 122. For example, the image gait value 316 may include information descriptive of a walk of the user 102 as they pass through the portal 106. Continuing the example, the image processing module 314 may determine a first estimated optical location of the user 102 from the image data 122 acquired at a first time. The image processing module 314 may also determine a second estimated optical location of the user 102 from the image data 122 acquired at a second time. One or more of the image gait value 316 or the image motion value 318 of the user 102 may be determined using the first estimated optical location and the second estimated optical location. For example, the image motion value 318 may comprise a vector value indicative of movement from the first estimated optical location to the second estimated optical location over time corresponding to the difference between the first time and the second time.

At 914, one or more of the image gait value 316 or the image motion value 318 are determined to be within a threshold value 320 of one or more of the estimated motion value 304 or the inertial motion value 312.

By utilizing the comparison module 308, information from the different sensors 110 associated with the mobile device 104 and the portal 106 may be combined. For example, the device identifier 114 associated with the portal data 118 provides information about the physical presence of the mobile device 104 at the portal 106. The device data 112 provides information about the motion of the user 102, but may not contain information that can be directly tied to a particular location in the facility 402. Likewise, the image data 122 provides some information about the movement or relative positioning of the users 102 at the portal 106 or elsewhere in the facility 402, but may not be reliable enough to use to identify a particular user 102 based on their appearance.

At 916, account data 126 is accessed. As described above, the account data 126 associates identification data of a mobile device 104 with a particular account. In some implementations, the identification module 324 may perform the operations of 916 through 920.

At 918, the device identifier 114, such as obtained with the portal data 118 by the portal 106, is used to determine the particular account associated with the mobile device 104, based on the account data 126.

At 920, presence data 128 indicative of presence of a person associated with the particular account at the specified volume is generated. For example, the identification module 324 may generate the presence data 128.

Figure 10:
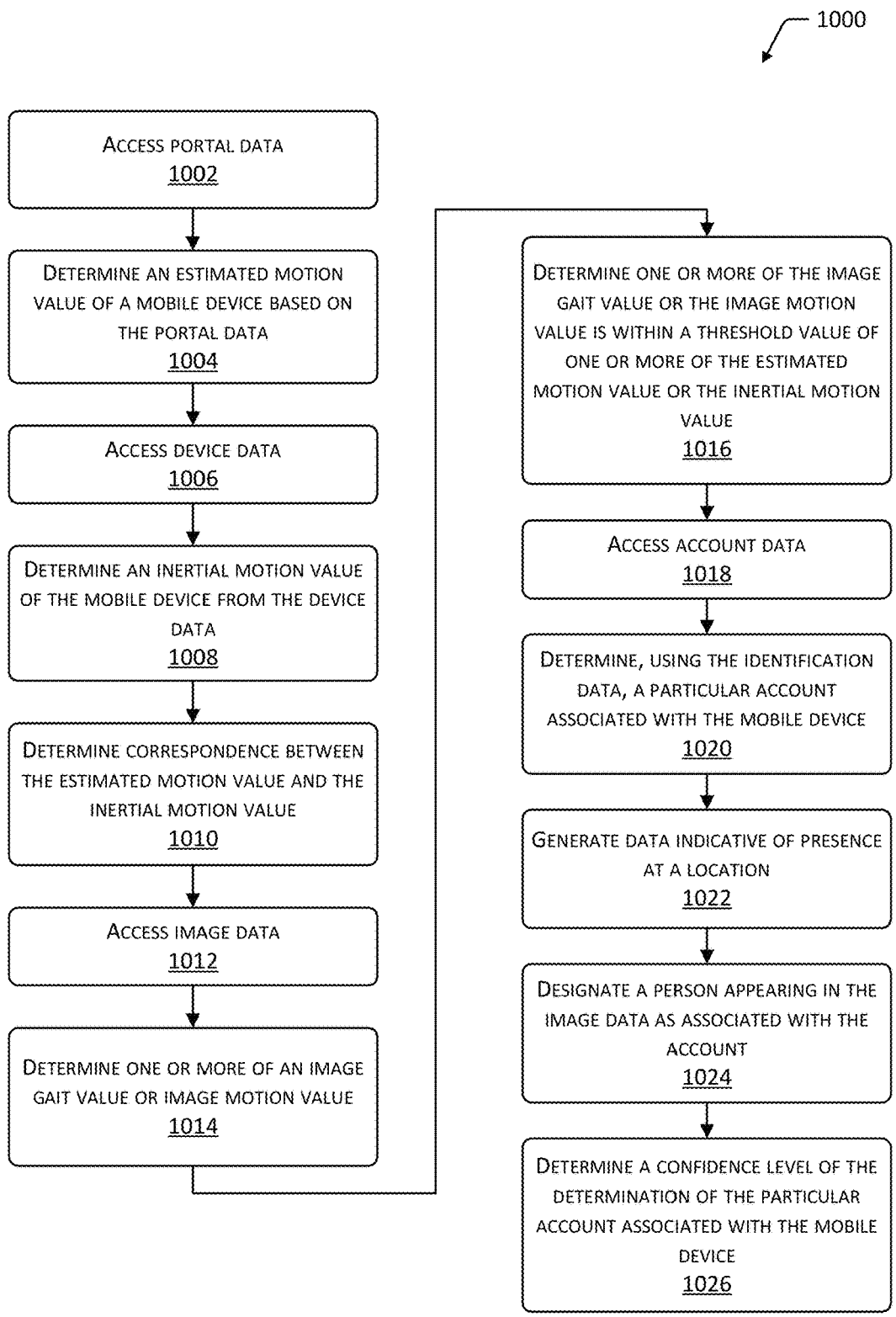
FIG. 10 depicts a flow diagram of a process of associating a person appearing in image data at a portal with a particular account, according to some implementations.

FIG. 10 depicts a flow diagram of a process 1000 of associating a person appearing in image data 122 at a portal 106 with a particular account, according to some implementations.

At 1002, first portal data 118(1) is accessed. The first portal data 118(1) may be obtained using a radio 108 having a first receiver at a first location in the facility 402. In some implementations, the first portal data 118(1) is associated with a signal transmitted by a first mobile device 104(1). For example, the first portal data 118(1) may comprise information based on a device signal transmitted by the radio 108 of the first mobile device 104(1).

In some implementations, the portal data 118 may include data identifying a particular phased antenna array. For example, the portal data 118 may include coordinates indicative of a location of the particular phased antenna array, an antenna identification number, and so forth. The portal data 118 may include an angular bearing associated with reception of the signal transmitted by the first mobile device 104(1) by the particular phased antenna array. For example, the angular bearing may indicate that the device signal from the mobile device 104 was received at an angle of 30° relative to a plane of the antenna array. The portal data 118 may also include signal strength data of the signal as acquired by the particular phased antenna array. For example, signal strength data may be expressed as a unitless value, decibel-milliwatts (dBm), and so forth.

At 1004, a first estimated motion value 304(1) of the first mobile device 104(1) is determined based on the first portal data 118(1). For example, the estimated motion module 302 may process the portal data 118. In some implementations, the portal data 118 may be used to generate other information. A count of different device identifiers 114 present in the first portal data 118(1) may be made. Using the count of different device identifiers 114, data indicative of a count of users 102 at the first location in the facility 402 such as the portal 106 may be determined. For example, a group of users 102 may enter the facility 402 walking closely to one another. The image processing module 314 may not be able to generate data indicative of a count of users 102. The count based on the device identifiers 114 may be used in this situation. In some implementations, a difference between a count generated by the image processing module 314 and the portal data 118 may be used to affect a confidence level in the output of the analysis module 124. For example, a disagreement between the count based on the image data 122 to a count based on the portal data 118 may result in the use of a human operator to determine the count.

At 1006, first device data 112(1) received from the first mobile device 104(1) is accessed. The first device data 112(1) may be transmitted responsive to one or more of the portal signal, based at least in part on a geolocation of the first mobile device 104(1), and so forth.

As described above, the first device data 112(1) is indicative of information gathered by one or more sensors 110 associated with the first mobile device 104(1). The first device data 112(1) may comprise information about one or more of acceleration of the first mobile device 104(1), compass heading of the first mobile device 104(1), rotation of the first mobile device 104(1), velocity of the first mobile device 104(1), geolocation of the first mobile device 104(1), or other information. For example, the velocity or the geolocation may be provided by the location sensor 110(17). In one implementation, the first device data 112(1) may be transmitted as a broadcast packet. This broadcast packet may be received by the one or more the radios 108 of the portal 106, or by another radio 108.

In another implementation, the first device data 112(1) may be sent directly to the server 120. For example, the first mobile device 104(1) may establish a connection with the server 120. The server 120 may then receive, from the first mobile device 104(1) via the connection, the first device data 112(1). The server 120 may determine first timestamp data indicative of a time of acquisition of the portal data 118 and second timestamp data indicative of a time of acquisition of the first device data 112(1). The server 120 may select first timestamp data and second timestamp data that are within a threshold value 320 of each other. For example, the timestamp data may differ due to clock drift, timing differences, and so forth.

In some implementations, the device data 112 may be encrypted by the mobile device 104. The server 120 may determine decryption credentials and then decrypt the first device data 112(1) using the decryption credentials. For example, a public key/private key cryptographic system may be used with the mobile device 104 encrypting the first device data 112(1) using a public key associate with the server 120.

At 1008, a first inertial motion value 312(1) of the first mobile device 104(1) based on the first device data 112(1) is determined. For example, the inertial motion module 310 may process the device data 112 to generate the inertial motion value 312.

At 1010, a first correspondence is determined that indicates the first estimated motion value 304(1) is within a threshold value 320 of the first inertial motion value 312(1). For example, the comparison module 308 may determine the estimated motion value 304(1) and the first inertial motion value 312(1) are within a threshold value 320 of one another.

At 1012, image data 122 is accessed. For example, the image data 122 may be obtained by the cameras 110(1) having a field-of-view that includes at least a portion of the first location in the facility 402 and an image of at least a portion of a person.

At 1014, one or more of an image gait value 316 or an image motion value 318 is determined. For example, the image processing module 314 may make this determination. As described above, the image gait value 316 may be indicative of a gait of the user 102 at the portal 106 that is based on the image data 122.

At 1016, one or more of the image gait value 316 or the image motion value 318 are determined to be within a threshold value 320 of one or more of the estimated motion value 304 or the inertial motion value 312.

At 1018, account data 126 is accessed. For example, the identification module 324 may access a data store that stores the account data 126. The account data 126 may include identification data indicative of the first mobile device 104(1) at the facility 402, such as a previously stored device identifier 114 that may have been obtained during a registration process.

At 1020, an account associated with the identification data is determined based at least in part on the device identifier 114.

At 1022, presence data 128 indicative of presence of a mobile device 104 associated with the account is generated. In some implementations, the presence data 128 may be indicative of a presence of a person in possession of the mobile device 104 that is associated with the account.

At 1024, the person appearing in the image data 122 is designated as associated with the account. For example, the person in the image data 122 obtained at the portal 106 during entry to the facility 402 may be determined to be user 102(3).

At 1026, a confidence level of the determination of the particular account associated with the mobile device 104 or person is determined. The confidence level may comprise a value that indicates reliability of the presence data 128. For example, the confidence level may be high when only a single user 102 passes through the portal 106. In comparison, the confidence level may be low when a group of users 102 passes through the portal 106 in close proximity to one another. In another example, the confidence level may be low when a group of users 102 passes through the portal 106 but one or more of those users 102 do not have a mobile device 104 that participates by sending a device signal.

When the confidence level of the presence data 128 is below a threshold value 320, further portals 106 throughout the facility 402 may be used to generate presence data 128 with a greater confidence level. For example, a group of users 102 may eventually split apart and go to different portions the facility 402. As a result, those individual users 102 may pass through additional portals 106 and subsequently have presence data 128 generated with the confidence level increasing with each pass through a portal 106.

In some implementations, a count may be made of the number of different locations at which the presence data 128 has been determined within a threshold time interval. Determination of confidence level may be generated based at least in part on this count. For example, the initial presence data 128 may have a relatively low confidence level due to the arrival of the user 102 within a large group. However, as the user 102 splits off from the group and travels through three portals 106 within five minutes, with consistent presence data 128 across those three portals 106, the confidence level of the association of the mobile device 104 or person with the account may be increased. Continuing the example, second portal data 118(2) may be obtained by a second receiver at a second location at the facility 402. The second portal data 118(2) is associated with operation of the first mobile device 104(1), such as by having the same device identifier 114 in a device signal. A second estimated motion value 304(2) of the first mobile device 104(1) may be determined based on the second portal data 118(2). Second device data 112(2) may be received from the first mobile device 104(1) and accessed. The second device data 112(2) is indicative of information gathered by one or more sensors 110 associated with the first mobile device 104(1) at a time corresponding to the second portal data 118(2). A second inertial motion value 312(2) of the first mobile device 104(1) may be determined based on the second device data 112(2). A second correspondence within a threshold value 320 between the second estimated motion value 304(2) and the second inertial motion value 312(2) may be determined. For example, the second estimated motion value 304(2) and the second inertial motion value 312(2) may be within a threshold distance of one another. Based on the first correspondence and the second correspondence, data indicative of an increased confidence level in the presence data 128 may be determined. For example, the confidence level may be higher when the first mobile device 104(1) is at a particular location at the facility 402.

By using the devices and techniques described in this disclosure, users 102 may be easily and accurately associated with particular accounts, allowing for identification of the users 102. Data from different sensors 110 is processed, and the results may be compared and used in concert with one another to determine the presence of a person associated with the particular account at the facility 402 or a particular portion thereof.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first antenna directed to a volume in a facility;
a second antenna directed to the volume in the facility;
at least one receiver, connected to one or more of the first and second antennas;
a first memory storing first computer-executable instructions;
a first hardware processor to execute the first computer-executable instructions to:
  generate first data indicative of:
    a received signal strength of one or more signals received by the at least one receiver, and
    a device identifier for a mobile device;
a camera that generates second data, wherein the camera has a field-of-view that encompasses the at least a portion of the volume in the facility; and
a server comprising:
  a network interface;
  a second memory storing second computer-executable instructions; and
  a second hardware processor configured to execute the second computer-executable instructions to:
    receive the first data using the network interface;
    determine an estimated motion value of the mobile device based on the first data, wherein the estimated motion value is indicative of a direction of motion and a speed during a first interval of time;
    determine, using the device identifier, an account associated with the mobile device;
    receive device data from the mobile device using the network interface, wherein the device data comprises information gathered by one or more sensors associated with the mobile device;
    determine an inertial motion value of the mobile device based on the device data;
    compare the estimated motion value of the mobile device, the inertial motion value of the mobile device, and a first threshold value;
    receive the second data using the network interface;
    determine one or more values based on the second data;
    determine the one or more values are within a second threshold value of one or more of the estimated motion value of the mobile device or the inertial motion value of the mobile device; and
    generate third data indicative of presence of a person associated with the account within the volume in the facility.

2. The system of claim 1, wherein the second data comprises image data, and wherein the second computer-executable instructions to determine the one or more values further comprising third computer-executable instructions to:
determine one or more of:
  an image gait value indicative of a gait cadence of a person based on the image data, or
  an image motion value of the person based on the image data; and
the second computer-executable instructions to determine the one or more values are within the second threshold value of the one or more of the estimated motion value of the mobile device or the inertial motion value of the mobile device further comprising fourth computer-executable instructions to:
  determine one or more of the image gait value or the image motion value is within the second threshold value of the one or more of the estimated motion value of the mobile device or the inertial motion value of the mobile device.

3. The system of claim 1, wherein the first data comprises:
a first received signal strength of a first signal as received using the at least one receiver at a first time;
a second received signal strength of a second signal as received using the at least one receiver at a second time; and
the second computer-executable instructions to determine the estimated motion value of the mobile device further comprising third computer-executable instructions to:
  determine a first estimated distance between the mobile device and the first antenna using the first received signal strength;

determine a second estimated distance between the mobile device and the second antenna using the second received signal strength;

access antenna coverage data indicative of a first volume in the facility covered by the first antenna and a second volume in the facility covered by the second antenna;

determine a first estimated location of the mobile device at the first time based on the antenna coverage data and the first estimated distance;

determine a second estimated location of the mobile device at the second time based on the antenna coverage data and the second estimated distance;

determine a direction of motion based on a comparison between the first estimated location of the mobile device and the second estimated location of the mobile device;

determine a movement distance between the first estimated location of the mobile device and the second estimated location of the mobile device;

determine a second interval of time by subtracting a value indicative of the first time from a value indicative of the second time;

determine a speed of the mobile device by dividing the movement distance by the second interval of time; and wherein the estimated motion value of the mobile device comprises information indicative of the direction of motion and the speed.

4. A system comprising:

one or more antennas directed to a volume in a facility;

at least one receiver connected to the one or more antennas;

a first memory storing first computer-executable instructions;

a first hardware processor configured to execute the first computer-executable instructions to:
generate first data based on one or more signals received by the at least one receiver;

a camera with a field-of-view encompassing at least a portion of the volume in the facility; and a server comprising:
a second memory storing second computer-executable instructions; and
a second hardware processor configured to execute the second computer-executable instructions to:
access the first data;
determine an estimated motion value of a mobile device based on the first data;
access second data received from the mobile device;
determine an inertial motion value of the mobile device based on the second data;
access third data from the camera;
determine one or more values from the third data;
compare the one or more values to one or more of the estimated motion value of the mobile device or the inertial motion value of the mobile device;
determine identification data associated with the mobile device;
determine an account associated with the identification data; and
generate fourth data indicative of presence of the mobile device associated with the account within the volume in the facility.

5. The system of claim 4, wherein the third data comprises image data including the at least a portion of the volume and at least a portion of a person;

wherein the second computer-executable instructions to determine the one or more values from the third data further comprising third computer-executable instructions to:
determine an image gait value indicative of a gait cadence of the person based on the image data; and
wherein the second computer-executable instructions to compare the one or more values to the one or more of the estimated motion value of the mobile device or the inertial motion value of the mobile device further comprising fourth computer-executable instructions to:
determine the image gait value is within a threshold value of the one or more of the estimated motion value of the mobile device or the inertial motion value of the mobile device.

6. The system of claim 4, wherein the third data comprises image data including the at least a portion of the volume and at least a portion of a person;

wherein the second computer-executable instructions to determine the one or more values from the third data further comprising third computer-executable instructions to:
determine an image motion value indicative of movement of the at least a portion of the person based on the image data; and
wherein the second computer-executable instructions to compare the one or more values to the one or more of the estimated motion value of the mobile device or the inertial motion value of the mobile device further comprising fourth computer-executable instructions to:
determine the image motion value of the person is within a threshold value of the one or more of the estimated motion value of the mobile device or the inertial motion value of the mobile device.

7. The system of claim 4, the second hardware processor to further execute the second computer-executable instructions to:
determine a count of different locations at which data indicative of presence of a person associated with the account has occurred within a threshold time interval; and
determine a confidence level in an association of the person with the account based on the count.

8. The system of claim 4, wherein the second data is indicative of output from a motion sensor of the mobile device, and the output from the motion sensor comprise information about one or more of acceleration of the mobile device, compass heading of the mobile device, rotation of the mobile device, velocity of the mobile device, or geolocation of the mobile device.

9. The system of claim 4, wherein the first data comprises at least:
a received signal strength of the one or more signals,
a timestamp indicative of a time when the one or more signals were received, and
the identification data.

10. The system of claim 4, the second hardware processor to further execute the second computer-executable instructions to:
receive the second data from the mobile device, wherein the second data comprises motion data indicative of motion from a sensor of the mobile device, wherein the inertial motion value of the mobile device is determined from the motion data; and
determine the estimated motion value of the mobile device and the inertial motion value of the mobile device are within a threshold value of one another.

11. The system of claim 4, wherein the first data comprises:
   data indicative of one of the one or more antennas, the one of the one or more antennas comprising a first phased antenna array,
   angular bearing associated with reception by the first phased antenna array of one or more of the one or more signals transmitted by the mobile device, and
   signal strength data indicative of signal strength of the one or more of the one or more signals as acquired by the first phased antenna array.

12. The system of claim 4, wherein the one or more antennas are located in one or more of:
   an overhead location within an aisle of the facility,
   an inventory location of the facility,
   a location within one or more sides of the aisle of the facility, or
   at an entry location to the facility.

13. The system of claim 4, wherein:
   the first data comprises:
      a first received signal strength of a first signal of the one or more signals received using the at least one receiver at a first time, and
      a second received signal strength of a second signal of the one or more signals received using the at least one receiver at a second time; and
   the second computer-executable instructions to determine the estimated motion value of the mobile device based on the first data further comprising third computer-executable instructions to:
      determine a first estimated distance between the mobile device and a first antenna using the first received signal strength;
      determine a second estimated distance between the mobile device and a second antenna using the second received signal strength;
      access first antenna coverage data indicative of a first volume in the facility covered by the first antenna;
      access second antenna coverage data indicative of a second volume in the facility covered by the second antenna;
      determine a first estimated location of the mobile device at the first time based on the first estimated distance and the first volume;
      determine a second estimated location of the mobile device at the second time based on the second estimated distance and the second volume;
      determine a direction of motion based on a comparison between the first estimated location of the mobile device and the second estimated location of the mobile device;
      determine a movement distance between the first estimated location of the mobile device and the second estimated location of the mobile device;
      determine an interval of time by subtracting a value indicative of the first time from a value indicative of the second time; and
      determine a speed of the mobile device by dividing the movement distance by the interval of time.

14. A method comprising:
   accessing first data associated with a mobile device, wherein:
      the first data is based on one or more signals received by at least one receiver; and
      the at least one receiver is connected to one or more antennas directed to a volume in a facility;
   determining an estimated motion value of a mobile device based on the first data;
   accessing second data received from the mobile device, the second data indicative of information from one or more sensors associated with the mobile device;
   determining an inertial motion value of the mobile device based on the second data;
   comparing the estimated motion value of the mobile device and the inertial motion value of the mobile device;
   accessing third data acquired by a camera with a field-of-view encompassing at least a portion of the volume in the facility;
   determining one or more values from the third data;
   comparing the one or more values to one or more of the estimated motion value of the mobile device or the inertial motion value of the mobile device;
   determining identification data associated with the mobile device;
   determining an account associated with the identification data; and
   generating fourth data indicative of presence of a person associated with the account within the volume in the facility.

15. The method of claim 14, wherein the third data comprises image data and further comprising:
   determining, based on the image data, an image gait value indicative of a gait cadence of a person appearing in the image data; and
   determining the image gait value is within a threshold value of the one or more of the estimated motion value of the mobile device or the inertial motion value of the mobile device.

16. The method of claim 14, wherein the third data comprises image data and further comprising:
   determining, based on the image data, an image motion value indicative of movement of at least a portion of a person appearing in the image data; and
   determining the image motion value is within a threshold value of the one or more of the estimated motion value of the mobile device or the inertial motion value of the mobile device.

17. The method of claim 14, further comprising:
   receiving the second data from the mobile device, wherein the second data comprises motion data indicative of motion from a sensor of the mobile device;
   determining the inertial motion value of the mobile device based on the motion data; and
   determining the estimated motion value of the mobile device and the inertial motion value of the mobile device are within a threshold value of one another.

18. The method of claim 14, further comprising:
   receiving, from the mobile device, the second data comprising information about one or more of acceleration of the mobile device, compass heading of the mobile device, rotation of the mobile device, velocity of the mobile device, or geolocation of the mobile device;
   generating the first data, wherein the first data comprises a received signal strength of the one or more signals received from the mobile device using the at least one receiver, one or more timestamps indicative of when the one or more signals were received, and the identification data; and
   transmitting the second data, the identification data, and the first data.

19. The method of claim 14, wherein:
the first data comprises data acquired at a first time and data acquired at a second time, the data acquired at the first and second times comprising:
   data indicative of an antenna,
   data indicative of an angular bearing associated with reception of one or more of the one or more signals from the mobile device,
   signal strength data of the one or more of the one or more signals from the mobile device as acquired by the antenna, and
   a device identifier included in the one or more signals; and
the method further comprising:
   accessing the data acquired at the first and second times;
   determining a location of the antenna;
   generating a first estimated location of the mobile device based on the location of the antenna, the angular bearing, and a first distance determined from the signal strength data at the first time;
   generating a second estimated location of the mobile device based on the location of the antenna, the angular bearing, and a second distance determined from the signal strength data at the second time; and
   generating the estimated motion value of the mobile device using the first estimated location, the second estimated location, and data indicative of an interval of time between the first time and the second time.

20. The method of claim 14, further comprising:
determining a count of different locations at which data indicative of presence of the person associated with the account has occurred within a threshold time interval; and
determining a confidence level in the association of the person with the account based on the count.

* * * * *

UNITED STATES PATENT AND TRADEMARK OFFICE
CERTIFICATE OF CORRECTION

PATENT NO. : 11,057,751 B1
APPLICATION NO. : 16/362378
DATED : July 6, 2021
INVENTOR(S) : Somasundaram Niranjayan et al.

It is certified that error appears in the above-identified patent and that said Letters Patent is hereby corrected as shown below:

In the Claims

Column 38, Claim 8, Line 46:
Currently reads: the motion sensor comprise
Where it should read: --the motion sensor comprises--

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*